US012620832B2

(12) United States Patent
Munson et al.

(10) Patent No.: US 12,620,832 B2
(45) **Date of Patent: *May 5, 2026**

(54) SYSTEMS AND METHODS FOR MONITORING POWER SYSTEMS

(71) Applicant: Fluid Power AI, LLC, San Diego, CA (US)

(72) Inventors: Brenton Parr Munson, San Diego, CA (US); Francis Mitchell Toglia, San Diego, CA (US); Jose Maria Guadalupe Gomez, San Diego, CA (US)

(73) Assignee: Fluid Power AI, LLC, San Diego, CA (US)

( * ) Notice: Subject to any disclaimer, the term of this patent is extended or adjusted under 35 U.S.C. 154(b) by 387 days.

This patent is subject to a terminal disclaimer.

(21) Appl. No.: 18/342,525

(22) Filed: Jun. 27, 2023

(65) Prior Publication Data

US 2024/0266867 A1 Aug. 8, 2024

Related U.S. Application Data

(60) Provisional application No. 63/497,280, filed on Apr. 20, 2023, provisional application No. 63/483,744, filed on Feb. 7, 2023.

(51) Int. Cl.
*H02J 13/12* (2026.01)
*G06N 3/0455* (2023.01)

(52) U.S. Cl.
CPC ............ *H02J 13/12* (2026.01); *G06N 3/0455* (2023.01)

(58) Field of Classification Search
CPC .................................................... G06N 3/0455
USPC ......................................................... 700/292
See application file for complete search history.

(56) References Cited

U.S. PATENT DOCUMENTS

| | | | |
|---|---|---|---|
| 6,199,018 B1 | 3/2001 | Quist et al. | |
| 6,591,244 B2 | 7/2003 | Jim et al. | |
| 6,823,289 B2 | 11/2004 | Kasuya et al. | |
| 7,308,322 B1 | 12/2007 | Discenzo et al. | |
| 8,401,297 B1 | 3/2013 | Apostolos et al. | |
| 8,843,328 B2 | 9/2014 | Curtiss, III | |
| 9,051,945 B2 | 6/2015 | Hague | |
| 9,275,536 B2 | 3/2016 | Wetherill et al. | |
| 9,443,195 B2 | 9/2016 | Micali et al. | |
| 9,699,529 B1 | 7/2017 | Petri et al. | |
| 9,739,813 B2 | 8/2017 | Houlette et al. | |
| 9,797,801 B2 | 10/2017 | Batcheller et al. | |
| 9,835,594 B2 | 12/2017 | Yoskovitz et al. | |
| 10,175,276 B2 | 1/2019 | Fishburn et al. | |
| 10,330,647 B2 | 6/2019 | Yoskovitz et al. | |
| 10,345,056 B2 | 7/2019 | Rollins et al. | |
| 10,369,898 B2 | 8/2019 | Newman et al. | |
| 10,452,978 B2 | 10/2019 | Shazeer et al. | |
| 10,622,684 B2 | 4/2020 | Koch et al. | |
| 10,712,738 B2 | 7/2020 | Cella et al. | |
| 10,907,722 B2 | 2/2021 | Besser et al. | |
| 10,983,097 B2 | 4/2021 | Yoskovitz et al. | |
| 11,146,212 B1 * | 10/2021 | Anderegg | ............. G01R 31/00 |

(Continued)

*Primary Examiner* — Md Azad

(57) ABSTRACT

Systems and methods for monitoring apparatus(es) and equipment using a sensor cluster are described. The systems and methods can be used to automatically repair or otherwise address actual and predicted failure modes of the apparatus(es), which include electrical systems, power systems, energy storage systems, and other systems.

16 Claims, 10 Drawing Sheets

(56)  References Cited

U.S. PATENT DOCUMENTS

| | | | |
|---|---|---|---|
| 11,188,065 B2 | 11/2021 | Vedula | |
| 11,493,379 B2 | 11/2022 | Yoskovitz et al. | |
| 11,493,482 B2 | 11/2022 | Rudyk et al. | |
| 11,493,558 B2 | 11/2022 | Tajima et al. | |
| 11,544,557 B2 | 1/2023 | Freed et al. | |
| 11,556,121 B2 | 1/2023 | Negri et al. | |
| 2002/0046006 A1 | 4/2002 | Qian et al. | |
| 2005/0096873 A1 | 5/2005 | Klein | |
| 2008/0255782 A1* | 10/2008 | Bilac | H02J 13/00001 |
| | | | 340/657 |
| 2011/0251807 A1 | 10/2011 | Rada et al. | |
| 2013/0178998 A1* | 7/2013 | Gadiraju | G01R 21/00 |
| | | | 700/296 |
| 2014/0114612 A1 | 4/2014 | Yoskovitz et al. | |
| 2018/0113218 A1 | 4/2018 | Albers et al. | |
| 2018/0143237 A1* | 5/2018 | Beaudet | G01R 31/42 |
| 2019/0074558 A1 | 3/2019 | Masias et al. | |
| 2019/0384255 A1 | 12/2019 | Krishnaswamy et al. | |
| 2020/0225655 A1 | 7/2020 | Cella et al. | |
| 2020/0355749 A1 | 11/2020 | Takahashi et al. | |
| 2021/0026321 A1* | 1/2021 | Gomez | G06N 3/08 |
| 2021/0078539 A1 | 3/2021 | Gonzalez et al. | |
| 2021/0173376 A1* | 6/2021 | Gomez | G01K 13/026 |
| 2021/0270778 A1 | 9/2021 | Yoskovitz et al. | |
| 2021/0380013 A1 | 12/2021 | Moszynski et al. | |
| 2021/0408967 A1* | 12/2021 | Anderegg | F24S 40/20 |
| 2022/0011763 A1 | 1/2022 | Negri et al. | |
| 2022/0197243 A1 | 6/2022 | Gomez et al. | |
| 2022/0334573 A1 | 10/2022 | Negri et al. | |
| 2022/0363404 A1* | 11/2022 | Auerbach | B64F 5/60 |
| 2022/0391635 A1 | 12/2022 | Lian et al. | |

* cited by examiner

Method 300

Generalized Voltage, Current, and Temperature Inputs (Time Series)

Method 400

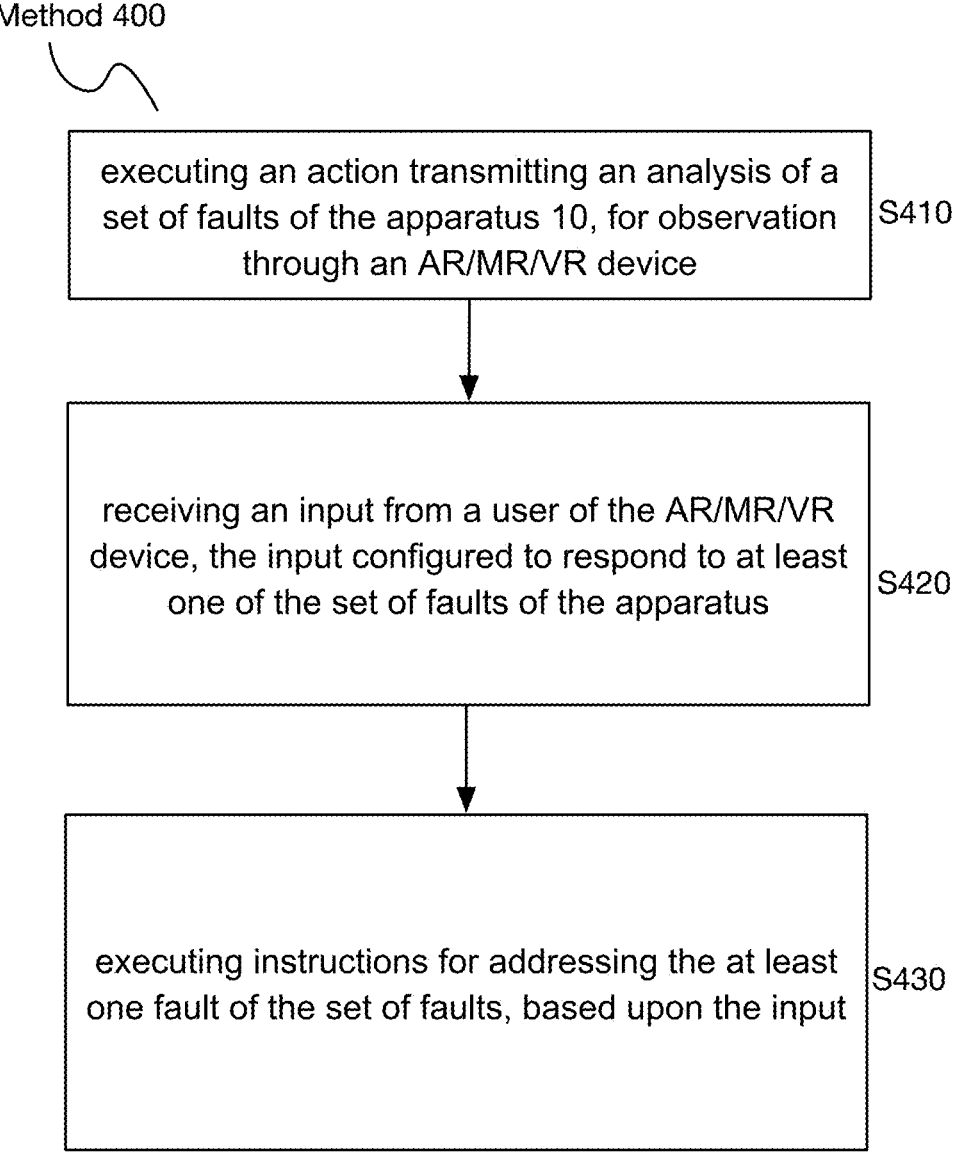

executing an action transmitting an analysis of a set of faults of the apparatus 10, for observation through an AR/MR/VR device | S410 receiving an input from a user of the AR/MR/VR device, the input configured to respond to at least one of the set of faults of the apparatus | S420 executing instructions for addressing the at least one fault of the set of faults, based upon the input | S430

FIGURE 6

SYSTEMS AND METHODS FOR MONITORING POWER SYSTEMS

CROSS-REFERENCE TO RELATED APPLICATIONS

This application claims the benefit of U.S. Provisional Application No. 63/483,744 filed on 7 Feb. 2023 and U.S. Provisional Application No. 63/497,280 filed on 20 Apr. 2023, which are each incorporated in its entirety herein by this reference.

TECHNICAL FIELD

This invention relates generally to fields related to electrical power system monitoring, and more specifically to new and useful systems and methods for monitoring electrical power system events at subcomponent and global levels, with generation of analyses to improve system maintenance and operation.

BACKGROUND

The commercial utilization of and ongoing costs of maintaining power systems is greatly impacted by proper maintenance practices that include regular service and replacement of system components. Furthermore, the technical domain knowledge required to properly troubleshoot and diagnose these complex systems is not readily available to the majority of power system maintainers and operators that rely on these systems to operate smoothly, with little or no downtime. The importance of proper operation will continue to grow, due to rapid increases in energy demand, and expanded options for providing energy through renewable sources and other sources. Furthermore, the current state-of-the-art in monitoring and predicting failure in power systems is limited by the need for vast amounts of data, compute-intensive training, hard-to-scale classification models, and equipment-specific limitations. With the rise of the industrial industry of things (IIOT), demand for improved maintenance and monitoring has rapidly increased. However, existing solutions are expensive to implement, do not scale in terms of data management, and are often machine specific.

The high opportunity cost of equipment downtime and the lack of resources to properly diagnose power systems and related equipment produces reactive maintenance practices where equipment is utilized in non-ideal states for long periods of time before finally failing, often catastrophically. Without the proper tools and domain expertise, technicians are typically under pressure to replace components in order to return systems to service with minimal downtime, once there is a failure event, but do not resolve the root cause of failure. This leads to accelerated system wear that results in an endless costly battle to keep systems in production. Consequences of equipment downtime and costs of repair have also been amplified significantly by supply chain issues resulting from past and current world events.

Unexpected downtime and poor system efficiency thus have associated costs that can be prevented or reduced with better monitoring, forecasting and troubleshooting systems. Current solutions for full system monitoring that can diagnose subcomponent issues in various types of power systems use many distributed sensors and custom algorithms. Implementing these options requires application-specific domain expertise, and the resources to design, deploy and maintain power systems is typically a non-optimal solution for utilities and operators, creating issues that affect all involved parties, down to the end consumer.

Thus, there is a need to create new, scalable, and useful systems and methods for evaluating power system events at subcomponent and global levels, with generation of analyses to improve system operation and maintenance effectively lowering total cost of ownership and maximize production output.

BRIEF DESCRIPTION OF THE FIGURES

FIG. 6 depicts a variation of a portion of a method for executing actions, in coordination with AR/MR/VR devices.

INCORPORATION BY REFERENCE

Figure 1A:
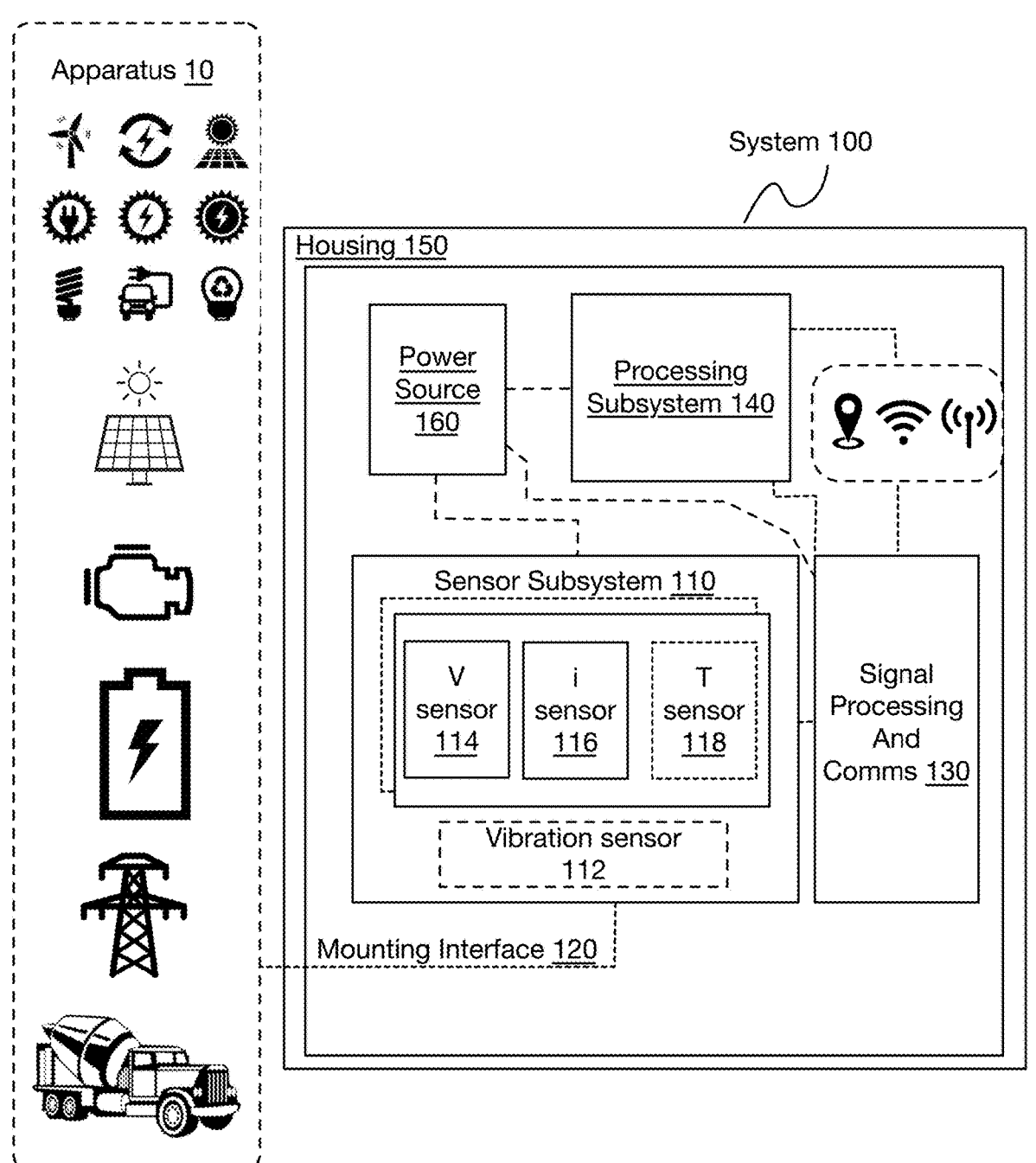
FIG. 1A depicts an embodiment of a system for apparatus monitoring.

All publications, patents, and patent applications mentioned in this specification are herein incorporated by reference in their entireties for all purposes and to the same extent as if each individual publication, patent, or patent application was specifically and individually indicated to be incorporated by reference. Furthermore, where a range of values is provided, it is understood that each intervening value, between the upper and lower limit of that range and any other stated or intervening value in that stated range is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

DESCRIPTION OF EMBODIMENTS

The following description of the preferred embodiments of the invention is not intended to limit the invention to these preferred embodiments, but rather to enable any person skilled in the art to make and use this invention.

1. Benefits

The inventions associated with the embodiments of systems and methods can confer several benefits over conventional systems and methods, and such inventions are further implemented into many practical applications across various disciplines.

For instance, the inventions described provide a new type of sensor and sensor platform for monitoring power systems for storing and/or distributing energy.

The inventions described also provide solutions for monitoring and predicting failure in electrical power systems, with the ability to handle vast amounts of data with low energy usage, apply novel classification model architecture, and operate without being designed to equipment-specific. The inventions provide solutions and have industrial applications and non-industrial applications.

The inventions can also provide a new class of edge deployment systems and methods for a platform, where the inventions provide deployment of computing and storage resources at the location where data is produced (e.g., on-chip), for applications of use described. As such, the practical applications of the inventions are extremely valuable to industries described. In embodiments, the invention can omit requirements for displays and/or codecs involved with traditional processing platforms that power various traditional devices, and incorporate use of larger neural processing units (NPUs) and central processing units (CPUs), with coupling to sensor subsystem front end components. As such, the inventions can provide a new class of artificial intelligence systems on chip (AiSoC). In particular the invention(s) include deployment of refineable and equipment specific models on the edge (e.g., at the apparatus) to generate application and equipment specific component-level insights.

In variations, the invention(s) can reuse model embeddings associated with unique apparatus and subcomponent signatures, and combine them with additional multi variate time series data to deliver greater insight with finer resolution and accuracy of analyses related to faults of subcomponents.

The inventions described also provide a system and platform for signal analysis, which provide improved tools for monitoring, forecasting, and troubleshooting events (e.g., failure modes, lifespans, etc.) of power systems and related subsystems at global and subcomponent levels. Such inventions prevent unexpected and unplanned maintenance events associated with one or more components, which have significant associated costs, thereby improving equipment availability, improving equipment performance and/or allowing equipment to have extended lifespans of use. Such inventions also can return outputs for anticipating future adverse events, such that preventative maintenance measures can be taken.

In specific examples, the invention(s) can be applied to monitoring of systems for storing and distributing power, in the context of solar energy systems, solar-thermal energy systems, wind energy systems (e.g., on-shore wind energy systems, off-shore wind energy systems), geothermal energy systems, hydropower energy systems, ocean energy systems, tidal energy systems, biomass energy systems, non-renewable energy source systems, and other power systems.

The invention(s) further provide a novel and innovative solution that addresses limitations in existing monitoring systems by detecting signals encoding physics of electrical dynamics (e.g., for power systems). In examples, the solution is a plug-and-play system for condition monitoring of electrical power systems, which can be applied to power systems described, and systems receiving energy from such power systems (e.g., with unidirectional or bi-directional interfaces for power transmission), such as for electric vehicle applications (e.g., terrestrial electric vehicle applications, aerial electric vehicle applications, marine electric vehicle applications, etc.). The exemplary solution utilizes a deep neural network to encode the physics of the electrical systems by monitoring a set of signal streams (e.g., voltage, current, and temperature) associated with an output of a battery, generator, inverter, motor, or other components, as well as time-series signals of relevant system characteristics such as rotation speed, torque demand, kinetic energy recovery systems and auxiliary electrical loads. From physics captured by the model as a signature, the model monitors the overall health of the system and predicts failure modes of electrical system subcomponents (e.g., as the battery pack, other energy storage components, other charging circuitry aspects, battery management systems, actuators, and charging equipment inputs and outputs).

In examples, the systems and methods described can detect, with edge-deployed devices, failure modes of the battery management system include short circuit faults, over and under-discharge faults, connector faults, insulation faults, and thermal management faults, while failure modes of the electric motor can include bearing faults, stator faults, and rotator faults. The proposed model is deployed and fine-tuned on the edge, eliminating needs for extensive data management and artificial intelligence-based backend architecture configured to process data remotely, with data communication latency factors.

As such, the invention(s) described can deliver real-time condition monitoring, predictive failure, and specific prognostics on equipment and application failures, with the ability to provide recommendations for executing fixes and/or directly executing fixes to issues, thereby providing a cost-effective and scalable alternative to current methods in the field.

In specific examples, the invention(s) can be further applied to monitoring of rotating equipment of systems described with one or more sensor types that sense vibration features of such equipment. Additionally or alternatively, the invention(s) can be applied to monitoring of electrical equipment through sensing of electrical characteristics (e.g., alone or in combination with vibration). Sensor types can include those described below, as well as peripheral sensors (e.g., microphones, strain gages, thermocouples, barometers, speed sensors, etc.), which are described.

The disclosure provides architecture (e.g., algorithms, sensor systems) for analysis of and prediction of failure events for subcomponents and global systems, as well as associated prognostics for repairing such equipment. In examples, such equipment can include rotating equipment and electrical equipment. The algorithms implemented by the system architecture described involve self-attention and masking of time series data from described sensor systems, that define an optimized (e.g., minimum) required set of signals to encode the energy input/flux of the system under observation. Model outputs are then used to affect system behavior and/or guide decisions for repairing equipment in a proactive manner.

2. Systems

As shown in FIG. 1A, an embodiment of a system 100 for evaluating apparatus events includes: a sensor subsystem 110; a mounting interface 120 between (e.g., coupling) the sensor subsystem 110 and an apparatus 10; a signal conditioning and communications subsystem 130 coupled to the sensor subsystem 110 and configured to receive outputs of the sensor subsystem 110; and a processing subsystem 140 operatively coupled to the signal conditioning and communications subsystem 130, the processing subsystem 140 including non-transitory media storing instructions that, when executed, perform operations for identifying, from outputs of the signal conditioning and communications subsystem 130/sensor subsystem 110, a set of signatures corresponding to states and events of the apparatus 10. The set of signatures are then used by the processing subsystem

140 to execute actions configured to respond to the states/events appropriately, thereby improving performance of the apparatus (e.g., in terms of output, in terms of efficiency, in terms of correcting undesired statuses, in terms of responding to failure modes, etc.). In variations, identification of signatures corresponding to various states of the apparatus 10 can be achieved with neural network model architecture (e.g., attention-based neural network model architecture); however, other variations of the processing subsystem 140 can implement other model architecture. Embodiments of the system 100 can also include a housing 150 configured to protect the sensor subsystem 110 and the signal conditioning and communications subsystem 130. Embodiments of the system 100 can additionally include a power source 160.

Figure 1B:
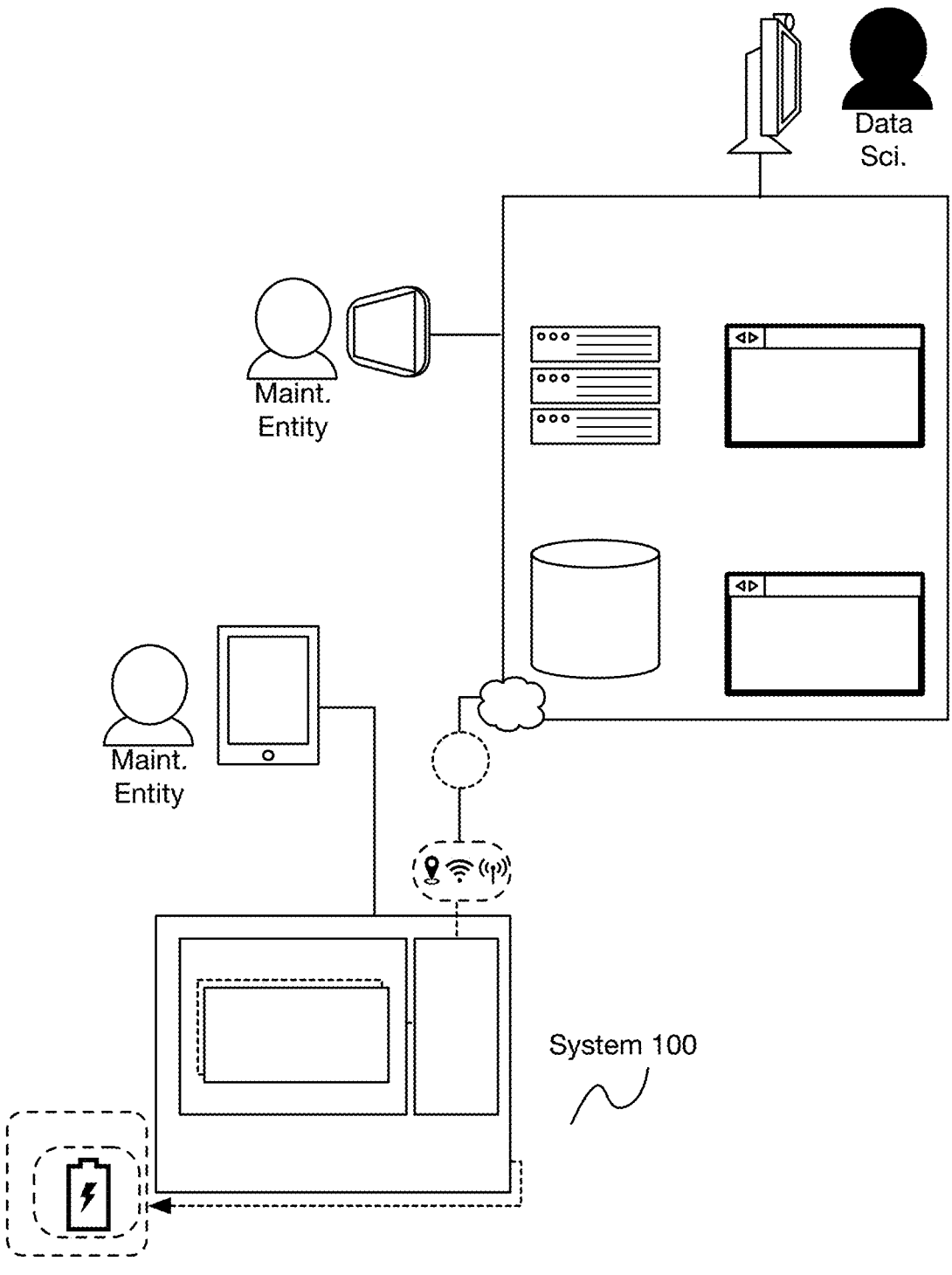
FIG. 1B depicts aspects of an embodiment of a system for apparatus monitoring.
Figure 1C:
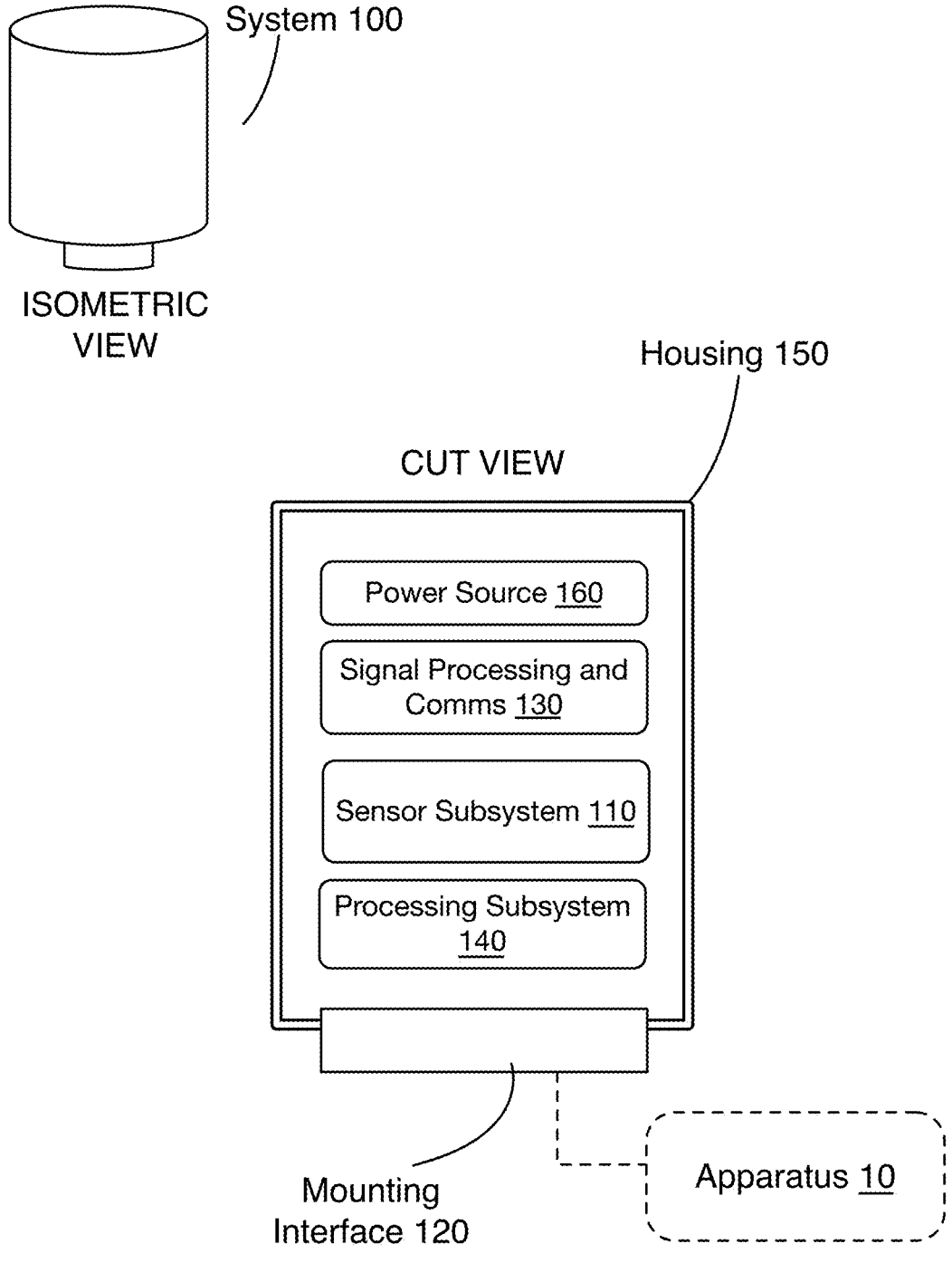
FIG. 1C depicts an example of an embodiment of a system for apparatus monitoring.

As shown in FIG. 1B, the processing subsystem 140 can include architecture for processing data, generating outputs, storing data, and/or providing interfaces to various entities/users, as described in further detail below. An example of the system 100 is shown in FIG. 1C.

The system 100 functions to provide improved tools for monitoring, forecasting, and troubleshooting events (e.g., failure modes, lifespans, etc.) of power system apparatus and related apparatus components at global and subcomponent levels, with respect to, electrical signal signatures, temperature signals and/or other signatures, where signatures for various applications of use are further described below. Subcomponents monitored by the system 100 can be positioned near or far from the mounting interface 120, and in examples, can include battery components, alternator components, capacitor components, other energy storage subsystem components, battery/storage management system components, charging input components, charging output components, other charging circuitry components, load management and distribution components, and other components. Exemplary electrical equipment subcomponents include: electric motors, electric actuators, rotors, stators, bearings, complete printed circuit board assemblies (PCBAs) and systems of PCBAs, fuses, passive components (e.g., capacitors, resistors, diodes, etc.), and active components (integrated chips, etc.).

Subcomponents monitored by the system 100 can further include one or more of: motor components (e.g., shaft components, fan components, rotor components, bearing components, sheave components, cylinder components, piston components, etc.).

In the context of solar energy systems, subcomponents monitored by the system 100 can include one or more of: solar panel components, inverter components, energy storage components, electrical panel components, electric meter components, interfaces to grid components, grid components, and other components.

In the context of solar-thermal energy systems, subcomponents monitored by the system 100 can include one or more of: solar panel components, inverter components, electrical panel components, electric meter components, mirror components, receiver components, heat exchanger components, storage tank components, interfaces to grid components, grid components, and other components.

In the context of wind energy systems (e.g., on-shore wind energy systems, off-shore wind energy systems), subcomponents monitored by the system 100 can include one or more of: rotor components, nacelle components, tower components, gearbox components, generator components, inverters, foundation components, inter-array cable components, substation components, export cable to onshore interconnection components, interfaces to grid components, grid components, and other components.

In the context of geothermal energy systems, subcomponents monitored by the system 100 can include one or more of: heat exchanger components, system pump components, valve components, compressor components, turbine components, generator components, cooling tower components, interfaces to grid components, grid components, and other components.

In the context of hydropower energy systems, subcomponents monitored by the system 100 can include one or more of: generator components, transformer components, powerhouse components, turbine components, components associated with intakes from a reservoir, components associated with control gates, components associated with penstock access, transformer components, interfaces to grid components, grid components, and other components.

In the context of ocean energy and/or tidal systems, subcomponents monitored by the system 100 can include one or more of: steam condenser components, liquid pump components, vacuum pump components, heat exchanger components, turbine components, turbine tunnel components, sluice gate components, ram joint components, turbine components, interfaces to grid components, grid components, and other components.

In the context of biomass energy systems, subcomponents monitored by the system 100 can include one or more of: fuel system components, steam production system components, turbine components, generator components, transformer components, interfaces to grid components, grid components, and other components.

Other components can include power plant components, transformer components for stepping up voltage, transmission line components, transformer components for stepping down voltage, distribution line components, and/or other components.

In the context of electric vehicles, subcomponents monitored by the system 100 can include one or more of: energy management system components, battery components, inverter components, electric motor components, drivetrain components, regenerative breaking system components, other electric vehicle electrical system components, and/or other components.

In the context of electric vehicle chargers, subcomponents monitored by the system 100 can include one or more of: alternating current (AC) supply components (e.g., single phase, 3-phase, fixed supply, etc.), metering and billing components, safety interlock components, components of level 1 and level 2 chargers (e.g., rectifier components, power control unit components, direct current (DC) converter components, protection components, battery monitor components, battery management components, etc.), components of level 3 chargers (e.g., control area network (CAN) bus control and authentication components, protection circuit components, battery monitor components, battery management components, etc.), inverter components (e.g., AC/DC bi-directional inverter components, other vehicle-to-grid charging components, and other components.

Additional apparatuses that can benefit from the invention(s) include: heavy equipment with electrified actuators (e.g., electric waste handling vehicles, electric heavy equipment, etc.); heavy equipment with hybrid electric drives (e.g., electric mining vehicles); and/or other heavy equipment.

The system 100 can also generate usage information from signals processed, at global and subcomponent levels of abstraction.

Such inventions associated with the system 100 thus prevent unexpected and unplanned maintenance events which have significant associated costs, thereby improving system performance and/or promoting apparatuses to achieve extended lifespans of use. Additionally, the system 100 functions to analyze individual subcomponents of equipment with a single set of sensors coupled to the equipment at a single position, thereby enabling operators to obtain operating life, health, remaining life, and/or other statuses of individual subcomponents in a manner that is significantly more efficient and lower in cost. In particular, the set of sensors can be used to assess apparatus statuses and events upstream and/or downstream of the position of coupling between the sensors and the apparatus, in a manner that has not previously been achieved. Furthermore, the system 100 functions to rapidly process signal streams, with extraction of multiple signal types and corresponding signatures, to obtain insights related to apparatus statuses and events.

In specific examples, the system 100 provides innovation in advanced sensor system design and machine learning approaches, in fields using systems (e.g., power systems and systems interfacing with power systems), to provide a plug-and-play, real-time monitoring and predictive maintenance solution in a cost-effective manner. In particular, the system 100 monitors a small number of system parameters and transmits data for processing (e.g., at least in part in cloud computing systems, in coordination between cloud and non-cloud based computing systems) to determine health statuses of the associated apparatuses, at the component level, in real time. Apparatuses statuses and actionable alerts are the provided by the system 100 to the user (e.g., using a customer portal), to enable them to streamline their equipment maintenance procedures and prevent downtime.

In embodiments, the system 100 can be configured to perform steps of embodiments, variations, and examples of a method 300 described in Section 3 below. However, the system 100 can additionally or alternatively be configured to perform other suitable methods.

Further details of components of the system 100 are described in the following sections.

2.1 System—Sensor(s)

As shown in FIGS. 1A-1B, the system 100 includes a sensor subsystem 110 including a voltage sensor 114, a current sensor 116, and a temperature sensor 118. The sensor subsystem 110 can further include other sensors, including a vibration sensor 112 and/or other auxiliary sensors, described in further detail below. The sensors of the sensor subsystem 110 collectively function to generate signals for monitoring a set (e.g., minimized set, discrete set, etc.) of signal types and/or number of a parameters, from which performance of the apparatus and/or demand on the apparatus can be extracted. In variations, the sensor subsystem 110 functions to monitor outputs of a battery 12 of the apparatus 10, and/or additional signals (e.g., time series signals, frequency domain derivatives of signals, etc.) capturing relevant system characteristics (e.g., rotation speed of subcomponents, torque demand of subcomponents, kinetic energy recovery subsystem component statuses, auxiliary electrical loads, etc.). The data can then be processed according to methods described in more detail below, in order to efficiently assess statuses of and/or anticipate events of the apparatus to which the system 100 is coupled, and its subcomponents. The outputs of the sensor subsystem can be combined to generate linear observable models that scale, as described in further detail below.

Voltage: The voltage sensor 114 functions to detect and measure voltage from electrical architecture of the apparatus or another apparatus configured to connect to the apparatus.

The voltage sensor 114 can include a capacitive type voltage sensor, which includes one or more capacitors to achieve voltage division. The voltage sensor 114 can additionally or alternatively include a resistive type voltage sensor, which includes one or more resistors that divide an input voltage and produce an output proportional to the voltage being measured. The voltage sensor 114 can additionally or alternatively include a Hall effect sensor that utilizes the Hall effect phenomenon to measure voltage (e.g., as a non-contact voltage sensor). The voltage sensor 114 can additionally or alternatively include an optical voltage sensor that employs the electro-optic effect to convert voltage variations into changes in light intensity, allowing for accurate voltage measurements.

The voltage sensor 114 can detect AC voltages and/or DC voltages.

Current: The current sensor 116 functions to detect and measure current from electrical architecture of the apparatus or another apparatus configured to connect to the apparatus. The current sensor 116 can be a sensor that senses current directly, or otherwise indirectly. The current sensor 116 can be an open-loop sensor, a closed-loop sensor, or a fluxgate sensor. In one example, the current sensor 116 is a shunt resistor current sensor, which utilizes a low-resistance shunt placed in series with a load to measure the voltage drop across it, allowing for accurate current measurement. In another example, the current sensor 116 is a Hall effect current sensor, which employs the Hall effect phenomenon to detect the magnetic field generated by a current-carrying conductor of the apparatus. In another example, the current sensor 116 can include one or more current transformers that include a primary winding to induce a current in a secondary winding, thereby providing isolation and stepping down the current for measurement purposes. In another example, the current sensor 116 is a current clamp/current probe, which can be clamped about a conductor to measure magnetic field and deduce current flowing through the conductor.

In relation to the voltage sensor 114 and/or the current sensor 116, the sensor subsystem 110 can alternatively include a resistance sensor and/or impedance sensor, which can be used to extract voltage data and/or current data, with suitable sensor system combinations. Still alternatively, the sensor subsystem can omit various sensor types.

Temperature: The temperature sensor 118 functions to measure the temperature associated with the apparatus (e.g., battery or other power system components of the apparatus). The temperature sensor 118 can include components (e.g., probes, other components) in contact or thermal communication with the apparatus, thereby enabling direct sensing of temperature of a components of the apparatus. Alternatively, in other variations, the temperature sensor 114 may not include components that are directly in contact with the apparatus 10, and instead operate in another manner (e.g., by measuring temperature of a component through optical means/infrared signatures/other radiation signatures). In an example, the temperature sensor 118 includes a thermocouple. In another example, the temperature sensor 118 is a resistance temperature detector (RTD), which utilizes a temperature-dependent resistor made of materials like platinum or nickel. The resistance of the RTD changes with temperature, which provides temperature measurements. In another example, the temperature sensor 118 is a thermistor that includes temperature-sensitive resistors made from ceramic or polymer materials. Thermistors exhibit a nonlinear relationship between resistance and temperature and are can be used for temperature measuring and control applications.

In variations, the sensor subsystem 110 can include a set of voltage sensors, a set of current sensors, and/or a set of temperature sensors, where the sets of sensors can include sensors of the same type or different types. Individual sensors of each type can be positioned to interface with different components of the apparatus 10, and/or be configured to have different sensitivities for detecting different ranges of parameter values (e.g., voltage below a threshold, voltage above a threshold, current below a threshold, current above a threshold, temperature below a threshold, temperature above a threshold, etc.) of the apparatus 10.

2.1.1 Additional Sensors

Vibration: In other examples, the sensor subsystem 110 can include a vibration sensor 112, which functions to detect and measure vibrations or accelerations sensed through the mounting interface 120 of the system, by converting mechanical motion into electrical signals for processing by the signal conditioning and communications subsystem 130 and/or processing subsystem 140. In embodiments, the vibration sensor 112 includes a sensing component (e.g., mass coupled to a spring element, piezoelectric material, MEMS components, etc.) that generates an electrical charge proportional to the applied force or acceleration. When vibrations occur, the sensing component produces an electrical signal output. The vibration sensor 112 can provide real-time data on vibration levels within the system 100 and/or apparatuses to which the system 100 is coupled, where conditioned and processed outputs of the vibration sensor 112 are fed as inputs into model architecture for returning component and subcomponent statuses, described in further detail below. The vibration sensor 112 can be a multi-axis sensor or a single-axis sensor. In a specific example, the vibration sensor 112 is a multi-axis accelerometer (e.g., 3-axis accelerometer).

In variations, the vibration sensor 112 can be rated to a maximum acceleration of: 10G, 20G, 30G, 40G, 50G, 60G, 70G, 80G, 90G, 100G, 200G, 300G, 400G, 500G, 600G, 700G, 800G, 900G, 1000G, 2000G, 3000G, 4000G, 5000G, an intermediate acceleration, or another acceleration threshold depending upon application of use.

In variations, the sensor subsystem 110 can include a set of vibration sensors, where the set of vibration sensors can include vibration sensors of the same type or different types. For instance, a set of vibration sensors can include a first vibration sensor configured for sensing vibrations having an associated first frequency range (e.g., vibrations below 500 Hz), and a second vibration sensor for sensing vibrations having an associated second frequency range (e.g., vibrations greater than or equal to 500 Hz).

Additionally or alternatively, set of vibration sensors can vibration sensors coupled or configured to sense vibrations from different regions of the apparatus (e.g., by coupling or by non-coupled sensing). In one example, non-coupled sensing can involve magnetic sensors configured to sense motion of components having detectable magnetic fields. In another example, non-coupled sensing can involve sensors configured to transmit light (e.g., laser light) onto different surfaces and detect light from different surfaces of the apparatus. In variations, outputs generated from the set of vibration sensors can be processed for determination of complex signatures and/or signatures aggregated from different sensor types (e.g., such as variations of sensors described above) and sensor positions relative to each other or to apparatus components. Complex signatures can be determined as a function of one or more of: signals from different sensor types, signals associated with different vibration frequencies, signals associated with spectral decompositions of modes of vibration, signals associated with acceleration parameters of vibration, signals associated with velocity parameters of vibration, signals associated with displacement parameters of vibration, signals associated with amplitude of vibration, signals associated with decay rate of vibration, signals associated with cyclic parameters of vibration, and/or other parameters of vibration.

In variations, additional sensors of the sensor subsystem 110 can include one or more ancillary sensors including: a sensor for monitoring engine revolutions per minute (RPM) (e.g., tachometer, position sensors interfaced with crankshaft components, magnetic RPM sensors, optical RPM sensors, etc.); an odometer; a CAN bus sensor; a generator RPM sensor (e.g., position sensors interfaced with rotating generator components, magnetic RPM sensors, optical RPM sensors, etc.); a wind speed sensor for wind energy applications; a rotor tip speed sensor for wind energy applications); a light sensors for solar energy applications; a wheel speed sensor (e.g., position sensors, encoders, etc.) in the context of electric vehicle applications; a motor current sensor, a motor voltage sensor; a stator position sensor, a motor temperature sensor, an engine oil sensor; a throttle position sensor; an incline grade sensor (e.g., with a MEMs multi-axial accelerometer); a tire pressure sensor, or a set of tire pressure sensors configured to detect load balancing across a vehicle; a landing gear load sensor; an inverter voltage sensor in the context of electric vehicle charger applications; an inverter current sensor in the context of electric vehicle charger applications; an inverter temperature sensor in the context of electric vehicle charger applications; an operating state sensor in the context of electric vehicle charger applications; a charge mode sensor; a load demand sensor; a microphone; a MEMs multi-axial accelerometer; a piezoelectric sensor; a magnetic flux sensors; a linear encoder; an angular encoder; a humidity sensor; a camera; and/or other sensor(s), where outputs of such sensors can be sampled and fed into variations of algorithms described below, in combination with processing of outputs of the sensor subsystem 110. In particular, application-of-use auxiliary sensor waveforms (e.g., time series sensor data streams) can be processed as model inputs with unassisted auto regression, to embed them and fine tune a system specific model that was generated using voltage, current, and temperature data streams, as described in further detail below.

In variations, the weight of the sensor subsystem 110 can be: 0.1 ounce, 0.2 ounce, 0.3 ounce, 0.4 ounce, 0.5 ounce, 0.6 ounce, 0.7 ounce, 0.8 ounce, 0.9 ounce, 1 ounce, 1.1 ounces, 1.2 ounces, 1.3 ounces, 1.4 ounces, 1.5 ounces, 1.6 ounces, 1.7 ounces, 1.8 ounces, 1.9 ounces, 2 ounces, 2.1 ounces, 2.2 ounces, 2.3 ounces, 2.4 ounces, 2.5 ounces, 2.6 ounces, 2.7 ounces, 2.8 ounces, 2.9 ounces, 3 ounces, 4, ounces, 5 ounces, 6 ounces, 7 ounces, 8 ounces, 9 ounces, 10 ounces, 11 ounces, 12 ounces, 13 ounces, 14 ounces, 15 ounces, 16 ounces, 2 lbs., 3 lbs., 4 lbs., 5 lbs., an intermediate weight, or another suitable weight, where the weight can be configured to not induce undesired vibrational effects in the system 100 or apparatus (e.g., the weight of the system 100 is significantly smaller than the apparatus).

In some embodiments, the sensor subsystem 110 can include material bodies configured to operate as resonant or amplifying bodies for enhancing quality of signals sensed by the sensor subsystem. Such material bodies can function to promote resonation or amplification of: optical signals (e.g., interfering optical signals), motion-sourced signals (e.g., interfering signals), temperatures, electrical signals (e.g., interfering electrical signals), magnetic signals (e.g., interfering magnetic signals), sound-sourced signals (e.g., interfering signals from environmental sound sources), and other signals.

The sensor subsystem 110 can additionally or alternatively omit one or more sensor types listed above. For instance, in relation to the processing subsystem 140 described in more detail below and/or implementation of training datasets in Section 3 below, the sensor subsystem 10 can omit sensor types as required, in relation to assessing apparatus subcomponent statuses and/or events with the fewest number of signal types required.

2.1.2 Power Source

Variations of the system 110 can further include a power source 160, which functions to provide regulated and unregulated electrical power to the system 100 (e.g., for sensing, signal processing, and communications operations) and to allow power storage for the system 100. The power source 160 can include an on-board battery (e.g., a lithium battery) that is configured to be rechargeable, but can alternatively comprise any other suitable rechargeable battery (e.g., nickel-cadmium, metal halide, nickel metal hydride, or lithium-ion polymer). Alternatively, the power source 160 can include a non-rechargeable battery (e.g., alkaline battery) that can be replaced to further enhance modularity in the system 100. Preferably, the power source 160 is configured to have a profile with a low aspect ratio, contributing to a small form factor of the system 100. However, the power source 160 can be configured to have any appropriate profile such that the power source 160 provides adequate power characteristics (e.g., cycle life, charging time, discharge time, etc.) for the system 100.

In variations where the battery of the power source 160 is rechargeable, the system 100 can also comprise a coil of wire and associated electronics that function to allow inductive coupling of power between an external power source and the power source 160, in order to enable wireless charging. The charging coil can converts energy from an alternating electromagnetic field (e.g., provided by a charging dock), into electrical energy to charge the battery. Inductive charging provided by the charging coil thus also facilitates movability of the system 100 (e.g., in embodiments where the system 100 can be repositioned). In alternative variations, however, the charging coil can be altogether omitted (e.g., in variations without a rechargeable battery), or replaced or supplemented by a connection (e.g., USB connection) configured to provide wired charging of a rechargeable battery.

In applications involving artificial reality (AR) devices, mixed reality (MR) devices, or virtual reality (VR) devices, on-board power sources can complement communication of insights derived from outputs of the system 100 to be observed through such AR, MR, and/or VR devices, such that monitoring can be performed in AR, MR, and/or VR space (e.g., for applications where a user is remote from the apparatus 10). As such, the user can monitor, through the AR, MR, and/or VR devices, the apparatus 10, and respond to various faults in near-real time or real-time, without significant lag due to latency issues. The on-board power source(s), and edge-deployment of monitoring, thus enable solutions for AR/MR/VR monitoring of an apparatus, without taxing processing power of the AR/MR/VR device. Associated methods (e.g., method 400) can include (as shown in FIG. 6): transmitting an analysis of a set of faults of the apparatus 10, for observation through an AR/MR/VR device S410; receiving an input from a user of the AR/MR/ VR device, the input configured to respond to at least one of the set of faults of the apparatus S420; and executing instructions for addressing the at least one fault of the set of faults, based upon the input S430, wherein the apparatus is positioned remote from the user. In an example, the AR/MR/ VR device can include: an Apple™ Vision device, an Oculus™ device, an HTC™ Vive device, a MERGE™ device, a Samsung™ Gear device, a Meta™ Quest device, or other suitable device. As such, the system 100 can provide real time streaming and leverage next generation AR/MR/ VR sensor suites and user interface platforms to bridge the gap between human and machine, for monitoring applications.

2.2 System—Mounting Interface

As shown in FIGS. 1A-1B, the system 100 includes a mounting interface 120 between the sensor subsystem 110 and the apparatus 10, where the interface 120 functions to provide a mechanism for reliable physical coupling of the sensor subsystem 110 to the apparatus, or reliable physical coupling of the sensor subsystem 110 to an object that enables detection of signals associated with the apparatus. In variations, the mounting interface 120 positions the sensor subsystem 110 and other system components contained within housing 150, to monitor outputs (e.g., voltage outputs, current outputs, temperature outputs) of a battery 12 of the apparatus 10, and/or additional signals (e.g., time series signals, frequency domain derivatives of signals, etc.) capturing relevant system characteristics (e.g., rotation speed of subcomponents, torque demand of subcomponents, kinetic energy recovery subsystem component statuses, auxiliary electrical loads, etc.)

The mounting interface 120 can include a first region that couples to the apparatus 10 (or object from which signals from the apparatus 10 can be detected) and a second region that couples to the first region, and positions the sensor subsystem 110 appropriately. The mounting interface 120 can be configured to permanently couple the system 100 to the apparatus (e.g., such that the system 100 is not easily moved). Alternatively, the mounting interface 120 can be configured to movably couple the system 100 to the apparatus, such that the system 100 can be re-positioned, if desired. The first region can be physically contiguous with the second region. Alternatively, the first region can couple with the second region by one or more of: a press-fit, a snap fit, a screw-based mechanism, a fastener-based mechanism, a magnetic mechanism, an adhesive, thermal bonding, or another suitable mechanism.

The mounting interface 120 can be configured to couple the system 100 to the apparatus away from components of the apparatus 10 that produce noise, such that the mounting interface never directly contacts the source(s) of noise (e.g., electrical noise, thermal noise, optical noise, etc.) in the apparatus (e.g., as a non-invasive detection system).

In variations, the mounting interface 120 can couple to the apparatus or object by one or more of: a press-fit, a snap fit, a screw-based mechanism, a magnetic mechanism, an adhesive, thermal bonding, or another suitable mechanism.

In a specific example, the mounting interface 120 can have a custom form factor (e.g., configured to mate or complement a surface of the apparatus or object). However, the mounting interface 120 can alternatively be non-custom.

In order to provide a robust mechanism of coupling with the apparatus 10, the mounting interface 120 can couple with a housing 150 (optional) of the system 100.

The mounting interface 120 and/or housing 150 can be composed of a material having suitable mechanical properties. In variations, materials of the housing 150 and/or other aspects of the mounting interface 120 can be configured to provide suitable mechanical properties in relation to stresses attributed to mechanical forces applied to the system 100 (e.g., radial stresses, shear stresses, longitudinal stresses, tensile stresses, compressive stresses, stresses associated with pressure vessels; stresses associated with impacts to the system 110 and/or the apparatus during use; stresses due to thermal expansion; stresses due to thermal contraction; and other associated stresses depending upon applications of use.

Additionally or alternatively, the housing 150 and/or mounting interface 120 can be composed of a material having suitable thermal properties. In variations, materials of the housing 150 and/or other aspects of the mounting interface 120 can be configured to provide suitable thermal properties in relation to one or more of: thermal conductivity, thermal expansion (e.g., in relation to having a desired level of thermal expansion); and other thermal properties depending upon application of use.

Additionally or alternatively, the housing 150 and/or mounting interface 120 can be composed of a material having suitable physical or surface properties. In variations, materials of the housing 150 and/or mounting interface 120 can be configured to provide suitable physical or surface properties in relation to one or more of: electrochemical properties (e.g., due to corrosive environments), electromagnetic properties (e.g., in relation to ultraviolet light exposure), and other surface or physical properties due to environment of use of the system 100.

The housing 150 can also function to provide a seal about sensitive electronic and other components associated with the sensor subsystem 110 (e.g., such as the monitor 130 described in more detail below). In variations, the seal can be a hermetic seal, a seal that allows passage of gasses but prevents passage of liquids, or another suitable type of seal. In these variations, the housing 150 can function as a seal, or can additionally or alternatively include sealing components (e.g., gaskets, o-rings, sealing compounds, etc.) at openings of the housing 121, or between various sub-portions of the housing 150.

The housing 150 surrounding one or more sensors of the sensor subsystem 110 and/or mounting interface 120 can provide an environmental protection rating of IP[0-6][0-9], and in a specific example, the housing 150 and mounting interface 120 provide an environmental rating of IP69K.

In specific examples, the housing 150 can be composed of a metallic material (e.g., aluminum), a metal-derived material, a ceramic material, a natural material, a synthetic material, or another suitable material. In other specific examples, the housing 121 can be composed of a polymeric material having suitable properties.

As described above, the mounting interface 120 can also couple the sensor subsystem 110 to other portions of the apparatus (e.g., in relation to mobile applications, in relation to industrial applications). In particular, the mounting interface 120 can allow coupling of electronics of the system 100 to a vehicle interface of the apparatus 10, for monitoring engine RPM or other operational demand characteristics. In variations, the mounting interface 120 can allow the sensor subsystem 110 to couple to a vehicle interface/CAN bus, with an associated protocol (e.g., J1939 protocol). However, other variations of the mounting interface 120 can allow the sensor subsystem 110 to couple to another type of vehicle interface or other type of apparatus interface, with another suitable protocol. In particular, the mounting interface 120 can allow coupling of electronics of the system 100 to an interface of the apparatus 10 for monitoring turbine RPM, generator RPM, load output (e.g., of an EV charger or other electrical energy output system), load input (e.g., for a bi-directional EV charging interface), or other operational demand characteristics.

As noted above, the mounting interface 120 can additionally or alternatively provide "contactless" coupling between the sensor subsystem 110 and portions of the apparatus 10. In variations, the interface 120 can thus include architecture for enabling non-contact sensing between sensors of the sensor subsystem 110 and the apparatus, with architecture for wireless signal transmission between various system components. A variation of non-contact sensing can employ a clamp or other coupler that couples the non-contact sensors to portions of the apparatus.

2.3 System—Signal Conditioning and Communications

As shown in FIGS. 1A-1B, embodiments of the system 100 can include a signal conditioning and communications subsystem 130, which functions to condition acquired signals from the sensor subsystem 110 onboard, and to facilitate wireless/wired communication of signals with the processing subsystem 140. As such, the signal conditioning and communications subsystem 130 can be configured to receive outputs of the sensor subsystem 110 and to transmit data derived from outputs of the sensor subsystem 110 to components of the processing subsystem 140 described in more detail below. In one embodiment, the signal conditioning and communications subsystem 130 is coupled to the sensors of the sensor subsystem 110 within the housing and configured to receive a signal stream from each sensor of the sensor subsystem 110. The signal conditioning and communications subsystem 130 can include a controller (e.g., an embedded control module) that samples data generated from the sensor subsystem 110, logs the data, and transmits the data (e.g., over a wireless connection, over a wired connection) to the processing subsystem 140 described below.

In variations, the signal conditioning and communications subsystem 130 can be configured to receive analog signals from the sensor subsystem 110. Additionally or alternatively, the signal conditioning and communications subsystem 130 can be configured to receive digital signals (e.g., signals that are digitized from analog signals, etc.) from the sensor subsystem 110. As such, signals from the sensor subsystem 110 can be transmitted to the signal conditioning and communications subsystem 130 as analog signals, or alternatively as digital signals (e.g., digitized from analog signals, etc.), and the signal conditioning and communications subsystem 130 can accordingly process and transmit data derived from the signals to the processing subsystem 140.

In a variations, the signal conditioning and communications subsystem 130 can include computer architecture and circuitry for one or more of: connectors between various sensor and components of the signal conditioning and communications subsystem 130 (e.g., in relation to sensor inputs), data storage, power source (e.g., battery, other power source), power management, and data transmission (e.g., via wireless communications, via wired communications, etc.). The signal conditioning and communications subsystem 130 can additionally or alternatively include architecture and circuitry for preconditioning of signals and/or data derived from the sensor subsystem 110 and/or other suitable functions. A specific example of the signal conditioning and communications subsystem 130 is described in Section 2.3.1 below.

2.3.1 Signal Conditioning and Communications—Specific Example

In a specific example, the signal conditioning and communications subsystem 130 includes an embedded controller comprising a computer comprising circuitry for interfacing with the sensor subsystem 110, with peripherals for debugging and wireless communication. In the specific example, the computer is an embedded single board computer of the signal conditioning and communications subsystem 130 that implements a Xilinx K26 Kria™ system-on-module (SOM) structured for edge computer vision applications, with artificial intelligence (AI) performance attributed to Zynq MPSoC architecture and architecture configured with various deep learning processing unit (DPU) or neural processing unit (NPU) configurations. Various DPU/NPU configurations (e.g., at 300 Hz) of the signal conditioning and communications subsystem 130 can provide performance of the following, in trillions of operations per second (TOPS): 0.5 TOPS, 0.6 TOPS, 0.7 TOPS, 0.8 TOPS, 0.9 TOPS, 1 TOPS, 1.1 TOPS, 1.2 TOPS, 1.3 TOPS, 1.4 TOPS, 1.5 TOPS, 2 TOPS, 3 TOPS, 4 TOPS, or greater, thereby achieving unprecedented performance with respect to computing operations involving machine learning architecture for such novel sensor configurations for monitoring apparatus.

The signal conditioning and communications subsystem 130 (e.g., Kria K26 SOM) supports a full range of data type precisions such as FP32, INT8, binary, and other custom data types, and operations on lower precision data type can consume low power (e.g., less than 0.03 picojoules, less than 0.05 picojoules, less than 1 picojoule, less than 10 picojoules, less than 50 picojoules, or up to 700 picojoules, depending upon operation).

In a specific example, the signal conditioning and communications subsystem 130, with processing subsystem 140 described below, includes an NPU is an NPU with 1 trillions of operations per second (TOPS) capability with energy use performance of less than 1 picojoule per operation. The NPU can include self-attention time-series transformer architecture comprising an encoder block comprising multi-head attention subarchitecture, described in more detail below. The self-attention time-series transformer architecture of the NPU can omit a decoder block, as described in more detail below. The NPU can be on-chip, for edge deployment applications described. Variations of the processing unit can alternatively include other architecture, as described.

In the specific example, the signal conditioning and communications subsystem 130 can include the following features: Application processor of Quad-core Arm® Cortex®-A53 MPCore™ up to 1.5 GHz; real-time processors of Dual-core Arm Cortex-R5F MPCore up to 600 MHz; general processing units (GPUs); camera interfaces; display interfaces; video encode architecture; video decode architecture; wireless architecture (CTR M.2/SATA) along with WiFi, LTE, and GPS architecture (e.g., Ublox NINA WiFI and Ublox SARA LTE); ethernet architecture; a sampling rate of up to or over 1 MHz per channel; and other features. The signal conditioning and communications subsystem 130 can be programmed and deployed using a suitable development environment.

In the specific example, the signal conditioning and communications subsystem 130 and/or processing subsystem 140 can additionally or alternatively include a processing component (e.g., central processing component) configured to process inputs from various sensors described, and/or additionally including camera inputs, microphones, and depth sensors, LiDAR sensors, and/or other sensors for processing spatial inputs. Such a CPU component can thus enable applications involving AR/VR/MR monitoring of the apparatus 10 and/or responding to various faults of the apparatus 10 in real-time or near real-time, with performance capability for processing and responses within 12 milliseconds, within 13 milliseconds, within 14 milliseconds, within 15 milliseconds, within 20 milliseconds, within 50 milliseconds, etc. In a specific application, the CPU components can include an Apple™ R1 chip.

In a specific example, the signal conditioning and communications subsystem 130 and/or processing subsystem 140 can additionally or alternatively include a system-on-chip (SoC) integrated circuit for memory interfaces, input/output devices, input/output interfaces, storage interfaces, memory interfaces, and other components described. In examples, the SoC can include a Snapdragon™ SoC with one or more NPUs, and digital signal processing units (DSPs), such as Hexagon™ DSPs.

In relation to sensor inputs from the sensor subsystem 110 and other inputs to the signal conditioning and communications subsystem 130, the signal conditioning and communications subsystem 130 of the specific example is configured to receive inputs associated with the sensor subsystem 110, digital inputs, and/or auxiliary inputs.

In the specific example, the signal conditioning and communications subsystem 130 can also include high speed industrial digital inputs. The industrial digital inputs can be used to monitor other inputs. The industrial digital input can also be used to monitor a frequency input associated with demand on the apparatus 10. These and other inputs are intended to be used for monitoring, in order to automate machine algorithm training, as described in more detail in relation to the processing subsystem 140 and associated methods below.

In the specific example, the signal conditioning and communications subsystem 130 includes a high density connector with dedicated inputs/outputs (I/O) for system peripherals and power supply couplings. The signal conditioning and communications subsystem 130 also includes a programming interface (e.g., USB interface) to program the computer and/or enable development functionality. The computer of the signal conditioning and communications subsystem 130 also includes a USB-to-Ethernet converter so the interface appears as an Ethernet network adapter with constant IP address on a separate host computer. The signal conditioning and communications subsystem 130 also includes a data storage module (e.g., uSD card connector for increased data storage). The controller of the signal conditioning and communications subsystem 130 uses the data storage module to log time series sensor data. The signal conditioning and communications subsystem 130 also includes an onboard battery to power the real time clock of the computer. The battery is also used for the global navigation satellite system (GNSS) module to improve signal lock time for tracking and navigation purposes in mobile applications of the system 100.

In the specific example, the signal conditioning and communications subsystem 130 also includes a power management module that receives an input voltage (e.g., 9-36V DC input voltage) and conditions the input voltage to provide necessary voltages for other architecture of the signal conditioning and communications subsystem 130. In relation to mobile applications of use, the monitor includes circuitry to condition the input voltage to deal with over voltage scenarios, under voltage scenarios, reverse polarity protection, and transients that are common in mobile (e.g., manufacturing, energy management, automotive, terrestrial, other mobile) applications. In more detail, in mobile applications, the controller is powered from the power source 160. To avoid draining the power source 160 while the apparatus is in an off or idle state, the power management module includes a power latching relay to remove power, if needed. In specific scenarios when the signal conditioning and communications subsystem 130 needs to remain powered on, the power management module implements a smart battery management system (SBMS) in the connection junction module. The SBMS charges while the apparatus is on and powers the control module when the vehicle is off. The SBMS communicates with the controller of the signal conditioning and communications subsystem 130 via CAN bus protocol to provide battery status. In order to maximize battery life, the controller of the monitor 130 goes into low power mode and periodically wakes up to monitor GPS location and transmit location and status to the host server.

In relation to data communication, the specific example of the signal conditioning and communications subsystem 130 achieves wireless communication using dedicated WiFi and cellular modems that interface to the computer. In the specific example, the radio antennas of the wireless communication components are external to the signal conditioning and communications subsystem 130 and couple to the signal conditioning and communications subsystem 130 (e.g., by a 50 Ohm SMA connector). The signal conditioning and communications subsystem 130 also includes a dedicated GNSS module for monitoring position data by global satellite. The GNSS module interfaces to the computer. In the specific example, the active GPS antenna is external to the signal conditioning and communications subsystem 130 and couples to the signal conditioning and communications subsystem 130 (e.g., by a 50 Ohm SMA connector).

2.4 System—Processing Components

As shown in FIGS. 1A-1B, the system includes a processing subsystem 140 operatively coupled to the signal processing and communications subsystem 130 and/or sensor subsystem 110 and including non-transitory computer-readable media storing instructions that, when executed (e.g., by one or more controllers in communication with the processing subsystem 140), perform operations for identifying, from outputs of the signal processing and communications subsystem 130 and/or processing subsystem 140, a set of unique signatures corresponding to states and events of the apparatus 10. The processing subsystem 140 thus functions to generate analyses (e.g., related to apparatus and subcomponent statuses and events) derived from signals, such as electrical signals and temperature-related signals, of the sensor subsystem 110, and to facilitate execution of response actions to improve or maintain the apparatus 10. In relation to generation of analyses, the processing subsystem 140 can also function to generate and process training and test datasets for development and refinement of models (e.g., neural network models involving machine learning), where the models return outputs associated with apparatus and subcomponent statuses and events from received sensor data.

The processing subsystem 140 can include one or more processing subsystems implemented in one or more of: a chip (e.g., a chip coupled to or co-located with the sensor subsystem 110 within housing 150), a remote server, a personal computer, a cloud-based computing system (e.g., Zeek™ platform, Amazon™ Web Services (AWS) platform, etc.), a computing module of a mobile electronic device (e.g., mobile communication device, AR/VR/MR device, wearable computing device, etc.), and any other suitable computing device. The processing subsystem 140 can communicate with other system components (e.g., signal conditioning and communications subsystem 130) and/or third party systems over a network 160, in relation to data transfer or other operations (e.g., some of which are described above). Furthermore, architecture of the processing subsystem 140 can overlap with that of the signal conditioning and communications subsystem 130 (e.g., on-chip), and/or be physically distinct from that of the signal conditioning and communications subsystem 130. For instance, in one variation, some components of the processing subsystem 140 can be on-board the signal conditioning and communications subsystem 130, and/or some components of the processing subsystem 140 can be distinct and implemented in the cloud and/or computing systems remote from the signal conditioning and communications subsystem 130. In an example, the processing subsystem includes an embedded processor (e.g., single or multi core processor with or without dedicated vector math accelerators).

In more detail, the network 160 functions to enable data transmission between system components and/or third party platforms. The network 160 can include a combination of one or more of local area networks and wide area networks, and/or can include wired and/or wireless connections to the network 160. The network 160 can implement communication linking technologies including one or more of: 802.11 architecture (e.g., Wi-Fi, etc.), 3G architecture, 4G architecture, 5G architecture, Ethernet, worldwide interoperability for microwave access (WiMAX), long term evolution (LTE) architecture, code division multiple access (CDMA) systems, digital subscriber line (DSL) architecture, and any other suitable technologies for data transmission.

In variations, the network 160 can be configured for implementation of networking protocols and/or formats including one or more of: hypertext transport protocol (HTTP), multiprotocol label switching (MPLS), transmission control protocol/Internet protocol (TCP/IP), file transfer protocol (FTP), simple mail transfer protocol (SMTP), hypertext markup language (HTML), extensive markup language (XML), and any other suitable protocol/format. The network 160 can also be configured for and/or provide, through communication links, encryption protocols for improving security of data transmitted over the network 160, with suitable security protocols (e.g., transport layer security (TLS), etc.).

As noted above, the processing subsystem 140 is configured to perform operations for identifying, from outputs of the signal processing and communications subsystem 130, a set of unique signatures corresponding to states and events of the apparatus 10. In variations, the operations can involve processes associated with one or more of: receiving a set of data streams, derived from outputs of the sensor subsystem 110, from the signal processing and communications subsystem 130; performing a set of transformation operations upon the set of data streams, with processing by one or more layers of model architecture; identifying a set of unique signatures corresponding to states and events of the apparatus 10 and subcomponents of the apparatus 10, from the set of transformation operations; returning an analysis including a recommended action for improving or maintaining proper performance of the apparatus 10, based upon the set of signatures; and optionally, executing the recommended action.

In one embodiment, the processing subsystem 140 stores instructions for operations including: receiving voltage data derived from the voltage signal stream of the voltage sensor, current data derived from the current signal stream of the current sensor, and/or temperature data derived from the temperature signal stream of the temperature sensor; performing a set of transformation operations upon said signal streams; identifying a set of unique signatures corresponding to states of a set of subcomponents of the apparatus, from the set of transformation operations; and returning an analysis comprising a recommended action for improving or maintaining proper performance of the apparatus, based upon the set of unique signatures. Data from auxiliary sensors can be processed in tandem with voltage data, current data, and/or temperature data, and/or used to refine models and improve accuracy of analyses generated according to the methods described.

As described in more detail below, the set of unique signatures includes signatures associated with voltage, current, and temperature, where signatures can indicate one or more statuses of: battery health; battery life (e.g., in relation to a duration of time, in relation to a number of cycles, etc.); alternator life (e.g., in relation to a duration of time); starter life; grounding faults; shorts (e.g., specific to sub circuits, etc.); generator life (e.g., in relation to a duration of time); coil health; bearing faults, shorts, overload status; operator error; battery life (e.g., in relation to a duration of time, in relation to a number of cycles, etc.); grounding faults; shorts (e.g., specific to sub circuits, etc.) overload status; battery cell fault status (e.g., faults of individual cells or other battery subcomponents); charge controller fault status; motor fault status; electric vehicle charger fault status; connector faults of EV chargers; cable faults of EV chargers; inverter faults of EV chargers, grounding faults of EV chargers; EV battery faults (e.g., such that faults of EV chargers and EVs can be discriminated during charging sessions); controller faults; and/or other faults associated with subcomponents described.

One or more operations executed in coordination with the processing subsystem 140 can implement ML models (e.g., neural network models) refined with training data generated by the system 100 and/or other systems, as described in relation to the method 300 below. Exemplary model architecture implemented by the processing subsystem 140 can include attention-based neural network architecture, which enhances the performance of various machine learning tasks by leveraging the concept of attention, inspired by human cognition, to enable the network to selectively focus on/enhance relevant parts of the input data while suppressing irrelevant information. As such, the implemented model architecture can improve computing performance in terms of total energy usage, time taken per task, and other performance aspects described, for various task types described. The attention-based neural network architecture includes multiple components, such as encoder and decoder layers, that work together to capture meaningful relationships between input elements. The attention mechanism allows the network to assign varying degrees of importance to different input elements based on their relevance to the task at hand, facilitating more effective information processing and learning, with dynamic attendance to crucial features. In particular, at each step or stage of the encoder/decoder architecture, inputs are processed with application of an attention mechanism (e.g., higher focus with increased weighting, or suppression of less relevant components) and feeding into the subsequent layer. The architecture can be feed-forward, or of another suitable format.

Details of the operations are further described in relation to embodiments, variations, and examples of the method 300 of Section 3 below.

In examples, returned outputs can indicate statuses of apparatus electrical systems described, which can be detected using sensor subsystem 110 and signal processing and communications subsystem 130, and used by the processing subsystem 140 (e.g., on-chip, with edge-deployment) to return outputs indicating statuses (e.g., fault statuses) of subcomponents. Amplitude components can be processed by model architecture to return statuses involving measurements that may be unique to a specific apparatus, in comparison to groups of similar apparatus "types" or "classes". Frequency components can alternatively be processed with fast Fourier transform (FFT) methods to return spectrum components and provide patterns that can be related to the design or function of the apparatus. Sets of frequency-based features returned by model architecture can indicate normal operation or the onset of faults or defects.

In various applications, the system 100 thus enables monitoring the Voltage, Current and Temperature at an electrical power source and/or associated generation and transmission elements (e.g., cables, power lines, power line infrastructure, etc.) with sufficient resolution and bandwidth to capture apparatus dynamics. Additionally, application-of-use-specific auxiliary sensor data components (e.g., time series sensor wave forms) are processed by model described below, with use of unassisted auto regression to embed auxiliary sensor data components or derivatives thereof, and refine the apparatus-specific models.

3. Method

Figure 2:
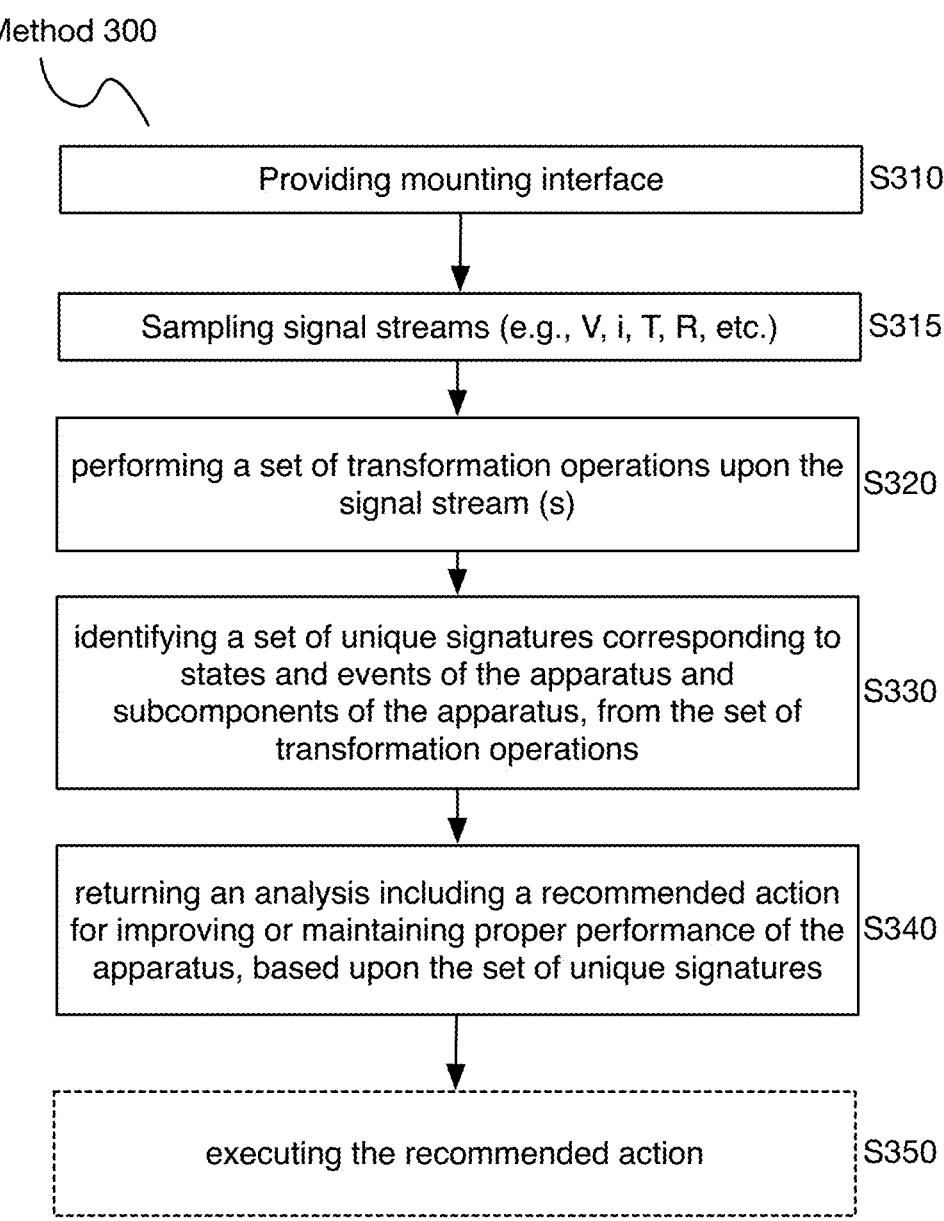
FIG. 2 depicts an embodiment of a method for apparatus monitoring.

As shown in FIG. 2, an embodiment of a method 300 for evaluating statuses of an apparatus includes: providing a mounting interface between a sensor subsystem and the apparatus S310, wherein the sensor subsystem comprises a set of sensors configured to detect voltage, current, and temperature associated with an output of a battery, generator, inverter, motor, or other components of the apparatus if the apparatus comprises the battery, the generator, the motor, or the inverter (and optionally, signals of relevant system characteristics such as rotation speed, torque demand, kinetic energy recovery systems and auxiliary electrical loads); sampling a voltage signal stream, a current signal stream, and a temperature signal stream generated from the sensor subsystem during operation of the apparatus S315; performing a set of transformation operations upon the voltage signal stream, a current signal stream, and a temperature signal stream S320, wherein the set of transformation operations comprises operations applied by self-attention time-series transformer architecture; identifying a set of unique signatures corresponding to faults of a set of subcomponents of the apparatus from the set of transformation operations S330; returning an analysis comprising a recommended action for improving or maintaining proper performance of the apparatus, based upon the set of unique signatures S340; and optionally, executing the recommended action S350.

The method 300 functions to provide improved tools for monitoring, forecasting, and troubleshooting events (e.g., failure modes, lifespans, etc.) of apparatus components at global and subcomponent levels. Exemplary applications of use are described in Sections above.

Such inventions associated with the method 300 thus prevent unexpected and unplanned maintenance events which have significant associated costs, thereby improving system performance and/or allow systems to have extended lifespans of use. Additionally, the method 300 can provide steps for analyzing individual subcomponents of equipment with a single sensor or sensor cluster coupled to the apparatus at a single position, thereby providing operators with information pertaining to operating life, health, remaining life, and/or other statuses of individual subcomponents in a manner that is significantly more efficient and lower in cost. In particular, signals generated by the set of sensors can be used to assess statuses and events upstream and/or downstream of the position of coupling between the sensors and the apparatus (e.g., associated with electrical load at various subcomponents, within transmission lines, within cables, within transformers, within generators, within turbines, within substations, at EV chargers, at EVs, etc.) in a manner that has not previously been achieved.

In embodiments, the method 300 can be implemented, at least in part, by system 100 elements described in Section 2 above. However, the method 300 can additionally or alternatively be implemented by other suitable systems/system components.

Further details of components of the method 300 are described in the following sections.

3.1 Method—Signal Acquisition

As shown in FIG. 2, Block S310 recites: providing a mounting interface between a sensor subsystem and the apparatus. Embodiments, variations, and examples of the mounting interface are described in Section 2 above, where the mounting interface can provide direct communication or indirect communication between the sensor subsystem (e.g., voltage sensor, current sensor, temperature sensor, auxiliary sensors, etc.) and an output of a battery, generator, inverter, motor, or other components (or other energy storage or energy provision component) of the apparatus.

As shown in FIG. 2, Block S315 recites: sampling a voltage signal stream, a current signal stream, and a temperature signal stream generated from the sensor subsystem during operation of the apparatus. Block S315 functions to monitor a discrete (e.g., minimized) set of signal types and/or number of a parameters, from which performance of the apparatus and/or demand on the apparatus can be extracted. The data derived from the signals can then be processed according to methods described in more detail below, in order to efficiently assess statuses of and/or anticipate events of the apparatus and its subcomponents.

The resolution of the voltage signal stream in Step S315 provides a level of detail or precision with which the voltage measurements are recorded and represented. The resolution can be characterized in terms of number of bits used to encode the data. A higher resolution implies a finer level of granularity in capturing voltage values, allowing for more precise measurements and a greater dynamic range. The resolution can be 8-bit, 9-bit, 10-bit, 11-bit, 12-bit, 13-bit, 14-bit, 15-bit, 16-bit, 17-bit, 18-bit, or greater.

The resolution of the current signal stream in Step S315 provides a level of detail or precision with which the current measurements are recorded and represented. The resolution can be characterized in terms of number of bits used to encode the data. A higher resolution implies a finer level of granularity in capturing voltage values, allowing for more precise measurements and a greater dynamic range. The resolution can be 12-bit, 8-bit, 9-bit, 10-bit, 11-bit, 12-bit, 13-bit, 14-bit, 15-bit, 16-bit, 17-bit, 18-bit, or greater.

The resolution of an impedance/resistance signal stream in Step S315 provides a level of detail or precision with which the impedance/resistance measurements are recorded and represented. The resolution can be characterized in terms of number of bits used to encode the data. A higher resolution implies a finer level of granularity in capturing voltage values, allowing for more precise measurements and a greater dynamic range. The resolution can be 8-bit, 9-bit, 10-bit, 11-bit, 12-bit, 13-bit, 14-bit, 15-bit, 16-bit, 17-bit, 18-bit, or greater.

The resolution of a temperature signal stream in Step S315 provides a level of detail or precision with which the temperature measurements are recorded and represented. The resolution can be characterized in terms of number of bits used to encode the data. A higher resolution implies a finer level of granularity in capturing voltage values, allowing for more precise measurements and a greater dynamic range. The resolution can be 8-bit, 9-bit, 10-bit, 11-bit, 12-bit, 13-bit, 14-bit, 15-bit, 16-bit, 17-bit, 18-bit, or greater.

As described in relation to the system above, Block S315 can include establishing an interface between the set of sensors and the apparatus (e.g., as described above). As such, the set of data streams can correspond to sensors of the set of sensors described above, wherein, in embodiments, the set of sensors can include: a voltage sensor, a current sensor, a temperature sensor, and/or auxiliary sensors and associated signal conditioning and communications architecture.

The set of data streams can, however, correspond to other signal types and/or signals of the same type, but from sensors not described above.

In relation to receiving the set of data streams, one or more of an embodiment of the monitor and the processing subsystem described above can receive the set of data streams over a wireless or wired connection, using any suitable transmission protocol.

Variations of signal streams can, however, include data outputs having units other than those depicted in the FIGURES, and/or can include derivative parameters or parameters correlating with those described and depicted.

3.2 Method—Extracting Signatures Associated with Statuses and/or Events

Block S320 recites: performing a set of transformation operations upon the set of data streams. The set of transformation operations function to receive, as inputs, the data streams of Block S315 in order enable extraction of signatures corresponding to events (e.g., historical events, anticipated events, usage, etc.) and/or statuses (e.g., health statuses) of the apparatus (e.g., at global and subcomponent levels) in Block S330, in relation to various faults associated with subcomponents and combinations of subcomponents described. As such, processing the inputs in S320 allows for returning of outputs related to various faults in Block S330, with generation of analyses in Block S340 below. The set of transformation operations can additionally or alternatively function to condition, clean, or otherwise generate derivative data types or objects to facilitate performance of subsequent method steps.

In relation to performing the set of transformation operations, an embodiment of the processing subsystem described above can receive the set of data streams of Block S310 over a wireless or wired connection, using any suitable transmission protocol. Receiving the set of data streams and performing the set of transformation operations can be performed real-time (e.g., with information transfer without significant delay from the time of initial signal generation, thereby enabling rapid responses). Additionally or alternatively, receiving the set of data streams and performing the set of transformation operations can be performed non-real time (e.g., with post-processing delay).

As noted above, the set of transformation operations can include layers of self-attention time-series transformer architecture that applies a modified self-attention transformer based architecture capable of processing multivariate time series data to encode voltage data, current data, and/or temperature data in an unsupervised fashion. In doing so, the measured voltage, current, and/or temperature of an apparatus with a power system (or configured to communicate with a power system) is embedded into a latent space representation of the temporal dynamics of the system. The latent space embedding is then used to classify vibrational failure modes. In embodiments, the processing subsystem described above can run a single neural network or a series of neural networks trained to identify and classify apparatus events (e.g., historical events, anticipated events, etc.), sub-component and global statuses, and any variations. As such, the set of transformation operations can take, as inputs, data derived from the signal streams and process them with trained artificial intelligence/neural network models for returning unique signatures in Block S330.

More detail regarding data, features, and training of models is described in 3.2.1 below.

The set of transformation operations can additionally or alternatively include operations associated with signal conditioning, noise removal, artifact mitigation, calibration, or other signal processing operations. Such operations can ensure signal stream quality prior to further processing in various method steps. In some variations, preprocessing the signal streams can include performing one or more steps to verify completeness of data (e.g., no lapse in the signal streams).

In relation to other transformation operations (e.g., after performance of a preprocessing operation), Block S320 can include one or more of: denoising, filtering, smoothing, clipping, transformation of discrete data points to continuous functions, and performing any other suitable data conditioning process. For instance, some variations of Block S320 can additionally include performing a windowing operation and/or performing a signal cleaning operation. In more detail, windowing can include any one or more of moving windows, exponentially weighted moving windows (EWMW), moving Gaussian methods, and any other suitable window filtering method.

In more detail, signal cleaning can include removal of signal anomalies by one or more filtering techniques. In specific examples, filtering can include one or more of: Kalman filtering techniques, bootstrap filtering techniques, particle filtering techniques, Markov Chain Monte Carlo filtering techniques; metropolis-Hasting methods; approximations (e.g., Laplace approximations); and/or other signal processing approaches. Signal cleaning can thus improve data quality for further processing, in relation to one or more of: noise, sensor equilibration, sensor drift, environmental effects (e.g., moisture, physical disturbance, etc.), and any other suitable type of signal artifact.

Transformation of discrete data points into a continuous function, can include performing an interpolation operation including one or more of: a spline (e.g., a b-spline interpolation), a Bessel function interpolation, a path integral operation (e.g., a Feynman-Kac path integral operation), and any other suitable interpolation operation. The interpolation operation can thus support a wavelet approximation operation, which requires a continuous function. The wavelet approximation operation can function to provide further smoothing and detrending of data from the sensor subsystem without distorting the underlying signal or introducing a time lag component. In variations, the wavelet basis functions can include any one or more of: Daubechies wavelets, Dual-Tree Complex wavelets, Haar wavelets, Newland wavelets, and any other suitable wavelet basis function(s). Furthermore, in variations, the wavelet analysis can implement a continuous wavelet transform that can construct a time-frequency representation of a signal.

Block S320 can additionally or alternatively include any other suitable signal processing operation.

Block S330 recites: identifying a set of unique signatures corresponding to states and events of the apparatus and subcomponents of the apparatus, from the set of transformation operations, which functions to process input data streams and/or derivative data, in order to properly return accurate outputs associated with fault events (e.g., electrical fault events), severity, and statuses of the apparatus. Block S330 can thus execute steps for unique signature identification associated with apparatus subcomponents, faults, and severity of faults, through event detection and attention-based neural network architecture described.

In variations, unique signatures derived from transformation of voltage data, current data, resistance data, impedance data, temperature data, and/or auxiliary data can be identified from model architecture, to output analysis related to faults of various systems, described below:

In the context of solar energy systems, unique signatures can indicate faults of subcomponents including one or more of: solar panel components, inverter components, energy storage components, electrical panel components, electric meter components, interfaces to grid components, grid components, and other components.

In the context of solar-thermal energy systems, unique signatures can indicate faults of subcomponents including one or more of: solar panel components, inverter components, electrical panel components, electric meter components, mirror components, receiver components, heat exchanger components, storage tank components, interfaces to grid components, grid components, and other components.

In the context of wind energy systems (e.g., on-shore wind energy systems, off-shore wind energy systems), unique signatures can indicate faults of subcomponents including one or more of: rotor components, nacelle components, tower components, gearbox components, generator components, inverters, foundation components, inter-array cable components, substation components, export cable to onshore interconnection components, interfaces to grid components, grid components, and other components.

In the context of geothermal energy systems, unique signatures can indicate faults of subcomponents including one or more of: heat exchanger components, system pump components, valve components, compressor components, turbine components, generator components, cooling tower components, interfaces to grid components, grid components, and other components.

In the context of hydropower energy systems, unique signatures can indicate faults of subcomponents including one or more of: generator components, transformer components, powerhouse components, turbine components, components associated with intakes from a reservoir, components associated with control gates, components associated with penstock access, transformer components, interfaces to grid components, grid components, and other components.

In the context of ocean energy and/or tidal systems, unique signatures can indicate faults of subcomponents including one or more of: steam condenser components, liquid pump components, vacuum pump components, heat exchanger components, turbine components, turbine tunnel components, sluice gate components, ram joint components, turbine components, interfaces to grid components, grid components, and other components.

In the context of biomass energy systems, unique signatures can indicate faults of subcomponents including one or more of: fuel system components, steam production system components, turbine components, generator components, transformer components, interfaces to grid components, grid components, and other components.

Other components can include power plant components, transformer components for stepping up voltage, transmission line components, transformer components for stepping down voltage, distribution line components, and/or other components, where the methods described can return unique signatures and fault statuses for such subcomponents.

In the context of electric vehicles, unique signatures can indicate faults of subcomponents including one or more of: energy management system components, battery components, inverter components, electric motor components, drivetrain components, regenerative breaking system components, other electric vehicle electrical system components, and/or other components.

In the context of electric vehicle chargers, unique signatures can indicate faults of subcomponents including one or more of: alternating current (AC) supply components (e.g., single phase, 3-phase, fixed supply, etc.), metering and billing components, safety interlock components, components of level 1 and level 2 chargers (e.g., rectifier components, power control unit components, direct current (DC) converter components, protection components, battery monitor components, battery management components, etc.), components of level 3 chargers (e.g., control area network (CAN) bus control and authentication components, protection circuit components, battery monitor components, battery management components, etc.), inverter components (e.g., AC/DC bi-directional inverter components, other vehicle-to-grid charging components, and other components.

Examples of faults of battery management systems can include short circuit faults, over and under-discharge faults, connector faults, insulation faults, and thermal management faults, while faults of an electric motor can include bearing faults, stator faults, rotator faults, and other faults.

3.2.1 Method—Signal Processing and Machine Learning Approaches

In relation to identification of unique signatures corresponding to events and/or statuses of the apparatus, the processing subsystem described above can implement architecture for classification (e.g., of failure modes and faults), with training of models by processing suitable training datasets. In particular, the unique characteristics of each event and status of the apparatus are not practically detectable in the mind, and are instead learned by the machine learning architecture in relation to Blocks S320-S340 of the method 300.

As introduced above, exemplary model architecture(s) used to process inputs and to generate faults, failure modes, and predictions of other statuses of the apparatus include the following:

Self-attention time-series transformer architecture with masking: Such architecture applies a modified self-attention transformer-based architecture capable of processing multivariate time series data, in order to encode voltage data, current data, resistance data, impedance data, temperature data, and/or auxiliary sensor data of the sensor subsystem in an unsupervised fashion. In doing so, the measured signal(s) of the apparatus or subcomponents thereof is embedded into a latent space representation of the temporal dynamics of the system. The latent space embedding is then used to classify failure modes and other health statuses.

In examples, model architecture includes a deep neural network to encode the physics of the electrical systems by monitoring signals associated with output(s) of a battery, as well as time-series signals of relevant system characteristics such as rotation speed, torque demand, kinetic energy recovery systems and auxiliary electrical loads. The model can thus be used to monitor the overall health of the system at global and subcomponent levels, and predict failure modes of electrical systems subcomponents such as the battery pack, actuator, and charging equipment.

In more detail, the model applies a modified self-attention transformer based architecture capable of processing multivariate time series data to encode voltage data, current data, and/or temperature data (and additionally or alternatively, other data, as described) in an unsupervised fashion. Variations of the architecture can alternatively encode a subset of signal types (e.g., with omission of temperature signals, with encoding of reduced subsets of signal types in relation to signal types described, etc.). The modified transformer encoder takes as input training samples, $X \epsilon R^{w \times m}$, which are multivariate time series of length w and m different variables. The training samples (e.g., training dataset) can be acquired from the sensor subsystem 110, where the training samples include data streams associated with acquired signals/data streams (e.g., voltage signal streams, current signal streams, temperature signal streams, resistance signal streams, impedance signal streams, auxiliary signal streams, etc.), with labels corresponding to known faults, failure modes, and statuses of the apparatus at global and subcomponent levels. To generate the training dataset(s), apparatuses and subcomponents with undiagnosed/unlabeled faults, failure modes, and statuses can be operated, and sensor signals can be acquired to generate the training dataset, with subsequent verification of classified statuses, with unsupervised multistage training. Alternatively, to generate the training dataset(s), apparatuses and subcomponents with diagnosed faults, failure modes, and statuses can be operated, and sensor signals acquired to generate the training dataset(s).

The original feature vectors $x_t$ are first normalized by subtracting the mean and divide by the variance across the samples of the training dataset. The normalized inputs are then linearly projected with bias onto a d-dimensional vector space, where d is the dimension of the transformer model sequence element representations: $u_t = W_p x_t + b_p$, where $W_p \epsilon R^{d \times m}$ and $b_p \epsilon R^d$ are fully learnable parameters and $u_t \epsilon R^d$, $t=0, \ldots, w$ are inputs to the transformer encoder. These inputs, which were transformed from the training dataset, become the queries, keys and values feeding into the self-attention layer, after adding the positional encodings corresponding to time, $t_w$. The multi-headed attention mechanism is altered by changing the normalizations from layer based to batch based, which allows for better handling of outlier signal data, and utilizing a Gaussian error linear unit (GELU) instead of a rectified linear unit (ReLU).

In a standard transformer which employs an encoder-decoder framework, the result of the transformer encoder block is sent along with the target shifted output sequence to the decoder block in a supervised fashion.

Embodiments of the model architecture can implement an alternative approach, with inclusion of architecture for seeking unbiased embedding of the health state of a piece of equipment. The decoder block can be omitted, and instead a single linear layer is used to predict the normalized input values. The degree to which these predicted system values recapitulate the source data allows the model to learn interdependencies between the monitored variables of the system, embed these relationships into a high dimensional state, and predict the state of the apparatus or subcomponents from sparse input data, in a manner that produces a higher level of efficiency with respect to computations performance and energy usage.

The multivariate time-series encoder can be trained in two stages, as indicated above. First, an unsupervised pre-training is performed to autoregress unlabeled time-series data of the training dataset. The goal of the unsupervised training is to encode an input spectrum into a meaningful latent space.

The resulting embedding allows both the original spectra to be decoded directly from the latent space representation but also facilitates downstream application for classification and forecasting of failure modes in electrical equipment or associated apparatuses. As described above, application-of-use-specific auxiliary sensor data can be processed by the model with unassisted auto regression to embed associated signatures and fine tune application-of-use-specific models.

Figure 3:
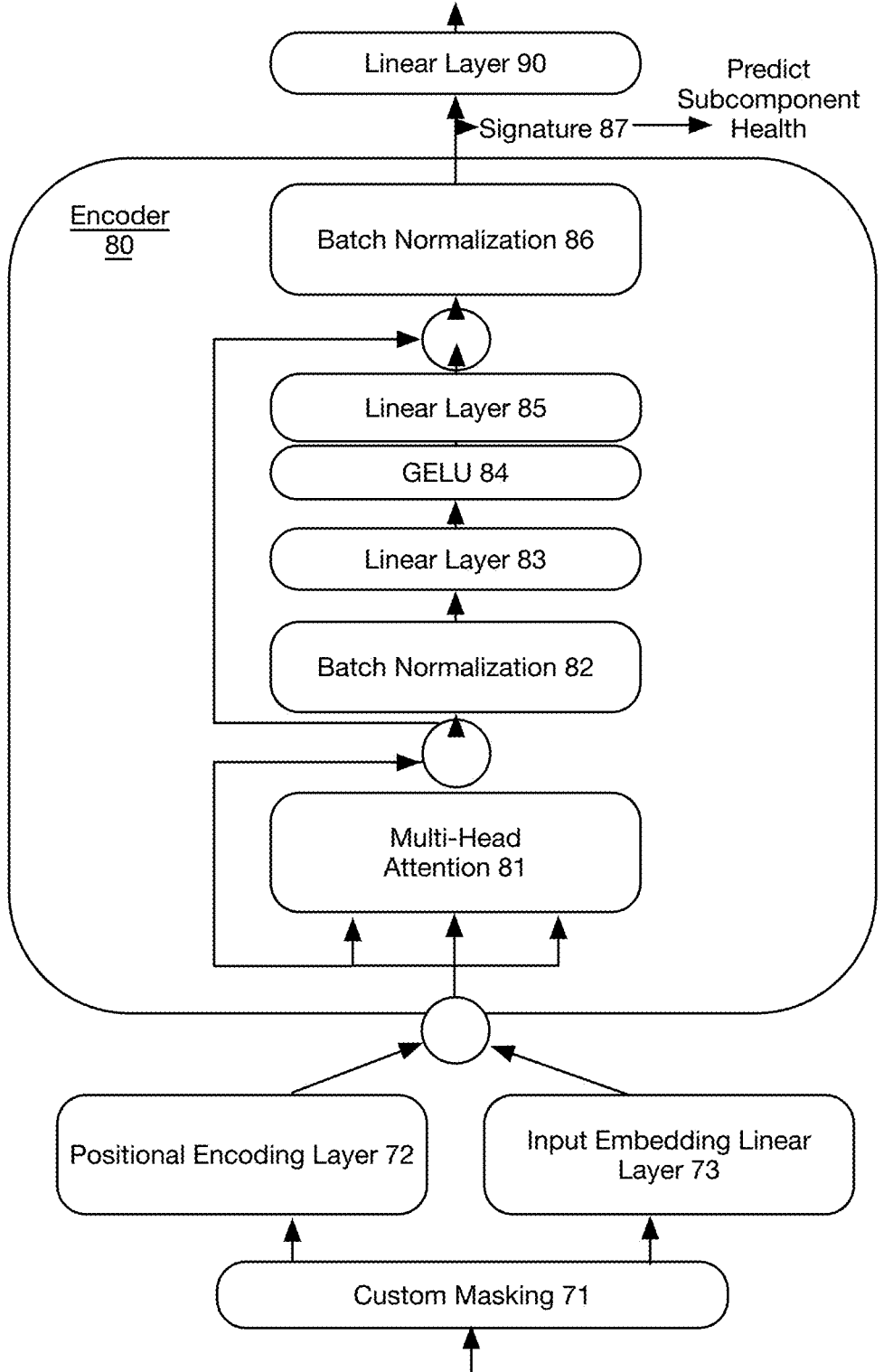
FIG. 3 depicts an example of attention-based model architecture for monitoring apparatuses.

FIG. 3 depicts a schematic of exemplary neural network architecture for the modified attention-based transformer encoder used to autoregress multivariate time series data of vibration in the apparatus, and/or subcomponents of the apparatus. In more detail with respect to model architecture, input data 70 is processed with a custom masking 71, followed by processing with a positional encoding linear layer 72 and an input embedding linear layer 73. Outputs of the positional encoding linear layer 72 and the input embedding linear layer 73 are then processed with an encoder block 80 including multi-head attention subarchitecture 81, followed by first batch normalization architecture 82, a first linear layer 83, a Gaussian error linear unit 84, a second linear layer 85, and second batch normalization architecture 86. Outputs of the encoder block include signature(s) 87, which are returned to a third linear layer 90 to generate second input data 91 (e.g., where autoregression architecture of the model is structured such that input data 91 is attempting to match input data 70, with iterative training).

The exemplary neural network architecture can include Pytorch implementation of a transformer encoder for multivariate time series containing 6 variables with a model dimension of size 128, 8 attention heads, a forward expansion of 4× in the feed-forward block, and a dropout fraction of 0.1 after batch normalization.

In relation to subsystems and equipment described, exemplary failure modes and other statuses that are returned by trained model architecture relate to prediction of a set of faults including:

In the context of solar energy systems, faults can include faults of: solar panel components, inverter components, energy storage components, electrical panel components, electric meter components, interfaces to grid components, grid components, and other components.

In the context of solar-thermal energy systems, faults can include faults of: solar panel components, inverter components, electrical panel components, electric meter components, mirror components, receiver components, heat exchanger components, storage tank components, interfaces to grid components, grid components, and other components.

In the context of wind energy systems (e.g., on-shore wind energy systems, off-shore wind energy systems), faults can include faults of: rotor components, nacelle components, tower components, gearbox components, generator components, inverters, foundation components, inter-array cable components, substation components, export cable to onshore interconnection components, interfaces to grid components, grid components, and other components.

In the context of geothermal energy systems, faults can include faults of: heat exchanger components, system pump components, valve components, compressor components, turbine components, generator components, cooling tower components, interfaces to grid components, grid components, and other components.

In the context of hydropower energy systems, faults can include faults of: generator components, transformer components, powerhouse components, turbine components, components associated with intakes from a reservoir, components associated with control gates, components associated with penstock access, transformer components, interfaces to grid components, grid components, and other components.

In the context of ocean energy and/or tidal systems, faults can include faults of: steam condenser components, liquid pump components, vacuum pump components, heat exchanger components, turbine components, turbine tunnel components, sluice gate components, ram joint components, turbine components, interfaces to grid components, grid components, and other components.

In the context of biomass energy systems, faults can include faults of: fuel system components, steam production system components, turbine components, generator components, transformer components, interfaces to grid components, grid components, and other components.

Faults of other components can include faults of power plant components, transformer components for stepping up voltage, transmission line components, transformer components for stepping down voltage, distribution line components, and/or other components, where the methods described can return fault statuses for such subcomponents.

In the context of electric vehicles, unique faults can include faults of: energy management system components, battery components, inverter components, electric motor components, drivetrain components, regenerative breaking system components, other electric vehicle electrical system components, and/or other components.

In the context of electric vehicle chargers, faults can include faults of: alternating current (AC) supply components (e.g., single phase, 3-phase, fixed supply, etc.), metering and billing components, safety interlock components, components of level 1 and level 2 chargers (e.g., rectifier components, power control unit components, direct current (DC) converter components, protection components, battery monitor components, battery management components, etc.), components of level 3 chargers (e.g., control area network (CAN) bus control and authentication components, protection circuit components, battery monitor components, battery management components, etc.), inverter components (e.g., AC/DC bi-directional inverter components, other vehicle-to-grid charging components, and other components.

Examples of faults of battery management systems can include short circuit faults, over and under-discharge faults, connector faults, insulation faults, and thermal management faults, while faults of an electric motor can include bearing faults, stator faults, rotator faults, and other faults.

Furthermore, previously unidentified signal features/signatures (e.g., new signals/signatures, interesting signals/signatures, etc.) can be returned by computing components during model refinement. In variations, such previously unidentified signal features/signatures can be processed and validated (e.g., with human validation, with other validation approaches), and once validated, the computing components can tag such signal features/signatures, such that additional instances of the signal features/signatures can be processed from other apparatus units for further model refinement and training.

While embodiments, variations, and examples of models (e.g., in relation to inputs, outputs, and training) are described above, models associated with the method 300 can additionally or alternatively include other blocks for statistical analysis of data and/or machine learning architecture.

Statistical analyses and/or machine learning algorithm(s) can be characterized by a learning style including any one or more of: supervised learning (e.g., using back propagation neural networks), unsupervised learning (e.g., K-means clustering), semi-supervised learning, reinforcement learning (e.g., using a Q-learning algorithm, using temporal difference learning, etc.), and any other suitable learning style.

Furthermore, any algorithm(s) can implement any one or more of: disaggregation methods, a regression algorithm, an instance-based method (e.g., k-nearest neighbor, learning vector quantization, self-organizing map, etc.), a regularization method, a decision tree learning method (e.g., classification and regression tree, chi-squared approach, random forest approach, multivariate adaptive approach, gradient boosting machine approach, etc.), a Bayesian method (e.g., naïve Bayes, Bayesian belief network, etc.), a kernel method (e.g., a support vector machine, a linear discriminate analysis, etc.), a clustering method (e.g., k-means clustering), an associated rule learning algorithm (e.g., an Apriori algorithm), an artificial neural network model (e.g., a back-propagation method, a Hopfield network method, a learning vector quantization method, etc.), a deep learning algorithm (e.g., a Boltzmann machine, a convolution network method, a stacked auto-encoder method, etc.), a dimensionality reduction method (e.g., principal component analysis, partial least squares regression, etc.), an ensemble method (e.g., boosting, boot strapped aggregation, gradient boosting machine approach, etc.), and any suitable form of algorithm.

Unlike conventional approaches that record data, store data internal to a device, stream data to the cloud, and subsequently analyze vibration data offline, the systems and methods described herein are built around predicting and forecasting failure on the device itself, with edge deployment capability. Implementing prediction on device removes the need to stream all acquired data to the cloud and batch level predictions on the equipment. In particular, an extremely beneficial aspect of the inventions involves transferring only insights (e.g., on the edge), and not entire data streams, with respect to the discussed edge deployment applications. Thus, the systems and methods described decrease the time and overhead needed to achieve an actionable insight. Embodiments of the inventions integrate software and hardware on the sensing device itself to achieve such goals.

Figure 4:
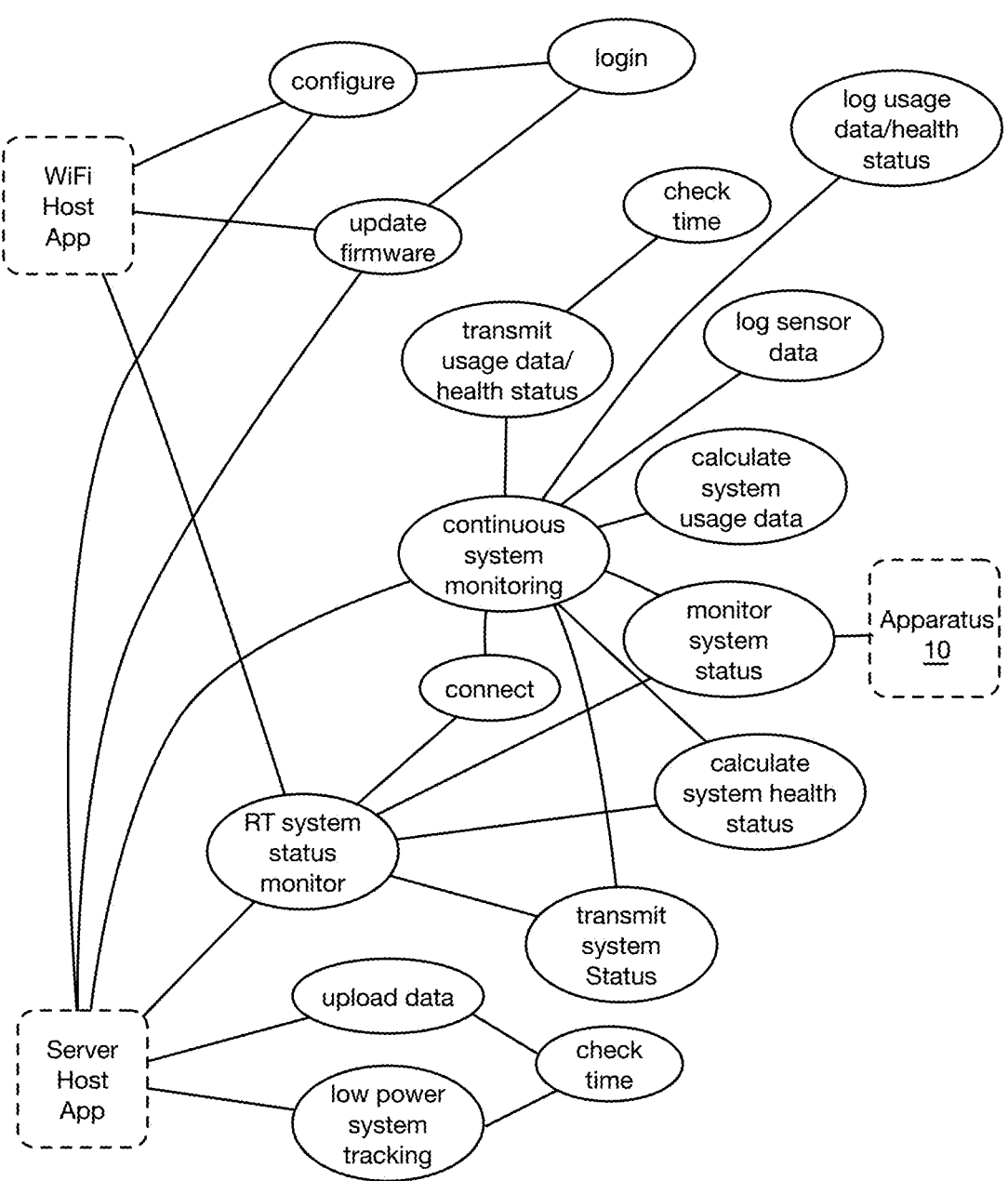
FIG. 4 depicts flow of various use cases associated with an embodiment of a system for apparatus monitoring.

However, non-edge deployment implementations are also applicable. FIG. 4 depicts use cases associated with the signal conditioning and communications subsystem 130, with interfaces between a wireless communication (e.g., WiFi) host application, a server host application (e.g., associated with processing subsystem 140 described below), and an apparatus 10. In FIG. 4, the signal conditioning and communications subsystem 130 interfaces with the apparatus 10 and logs sensor data from the sensor subsystem 110, with logging of apparatus data for associated status determinations related to components and subcomponents of the apparatus.

The signal conditioning and communications subsystem 130 can perform various signal conditioning operations, in order to provide compatibility with measurement and/or control systems, and/or in relation to pre-processing of signal data for use as inputs into models described in further detail below. Signal conditioning operations can include processes such as amplification, filtering, isolation (of sensitive components), and digitization, and other processes. Filtering can eliminate unwanted noise or interference from the signal (on-chip), in order to provide a cleaner and more reliable output, where algorithms for filtering are described in further detail below.

Signals can then be processed by model architecture described below, in order to generate outputs pertaining to health statuses of the apparatus 10 and subcomponents of the apparatus 10.

In relation to health statuses, the signal processing and communications subsystem 130 and/or processing subsystem 140 described below can return notifications associated with maintenance event flags, pertaining to one or more of: component replacement, other failure modes, and overall system statuses. Usage data can also be returned and be associated with one or more of: cycle count, cycle time/life of batteries or other energy storage systems (e.g., average), route segment time (e.g., average) for vehicle applications, demand (e.g., average RPM), GPS location, and other usage data.

The signal processing and communications subsystem 130 also transmits pre-conditioned data, apparatus usage data, and other system statuses over wireless communications for further processing (e.g., using communications components described above). The signal processing and communications subsystem 130 also receives firmware updates and/or configurational aspects (e.g., by way of a host application), and transmits data and power management information (e.g., related to low power operations) to the server host application. An example continuous monitoring mode, data transmission mode, low power mode, real-time system monitoring by server host application mode, real-time system monitoring by host application mode, configuration mode, and firmware update mode are described below:

In more detail, in continuous monitoring modes of operation, the signal processing and communications subsystem 130 interacts with the apparatus 10 and the server host application, and with operation of the apparatus 10, the signal processing and communications subsystem 130 monitors apparatus 10 usage (e.g., at subcomponent and global levels), health statuses (e.g., at subcomponent and global levels), and other system statuses. The signal processing and communications subsystem 130 also logs receives and logs data from the sensor subsystem 110. The signal processing and communications subsystem 130 also transmits data to the server host application by wireless communications, as described above (and buffers data with repeated transmission attempts if transmission is unsuccessful).

In more detail, in data transmission modes of operation, the signal processing and communications subsystem 130 receives signals generated from the apparatus 10, and interacts with the server host application. The signal processing and communications subsystem 130 verifies that time is within a suitable data transmission time window, and uploads data (e.g., time series sensor data) to the server by wireless communications, as described above. The signal processing and communications subsystem 130 can transition to a low power mode of operation (described in the immediately following paragraph), and/or buffer data with repeated transmission attempts if transmission is unsuccessful.

In more detail, in low power modes of operation, the signal processing and communications subsystem 130 receives signals generated from the apparatus 10, and interacts with the server host application, and/or an operator of the apparatus 10. With successful data transmission to the server or a maximum number of unsuccessful data transmission attempts exceeded, the signal processing and communications subsystem 130 enters a low power mode of operation, periodically transmits status information to the server, and monitors battery status of the signal processing and communications subsystem 130. In the event that the signal processing and communications subsystem 130 enters a critical battery status, the signal processing and communications subsystem 130 powers off peripherals, removes power from the controller of the signal processing and communications subsystem 130, and/or performs other low power operation modes.

In more detail, in real-time system monitoring by server host application modes of operation, the signal processing and communications subsystem 130 receives signals generated from the apparatus 10, and interacts with the server host application. The server host application connects with the controller of the monitor 130, which streams data to the server host application. With processing, analyses (e.g., in relation to health statuses and other returned outputs) are presented to an operator of the apparatus 10. In variations, the server host application can request to disconnect from the signal processing and communications subsystem 130, which closes the connection. In alternate flows, with connection initiation failure or connection disconnect failure, the server host application can attempt to connect or disconnect a threshold number of times.

In more detail, in real-time system monitoring by host application modes of operation, the signal processing and communications subsystem 130 interacts with the apparatus 10 and the server host application. The host application connects with the controller of the signal processing and communications subsystem 130, which streams data to the server host application. With processing, analyses (e.g., in relation to health statuses and other returned outputs) are presented to an operator of the apparatus 10. In variations, the server host application can request to disconnect from the signal processing and communications subsystem 130, which closes the connection. In alternate flows, with connection initiation failure or connection disconnect failure, the server host application can attempt to connect or disconnect a threshold number of times.

In configuration modes of operation, the signal processing and communications subsystem 130 interacts with the server host application and the apparatus 10, for configuration adjustments.

In firmware update modes of operation, the signal processing and communications subsystem 130 interacts with the server host application and/or the apparatus 10, to receive firmware updates.

Figure 5:
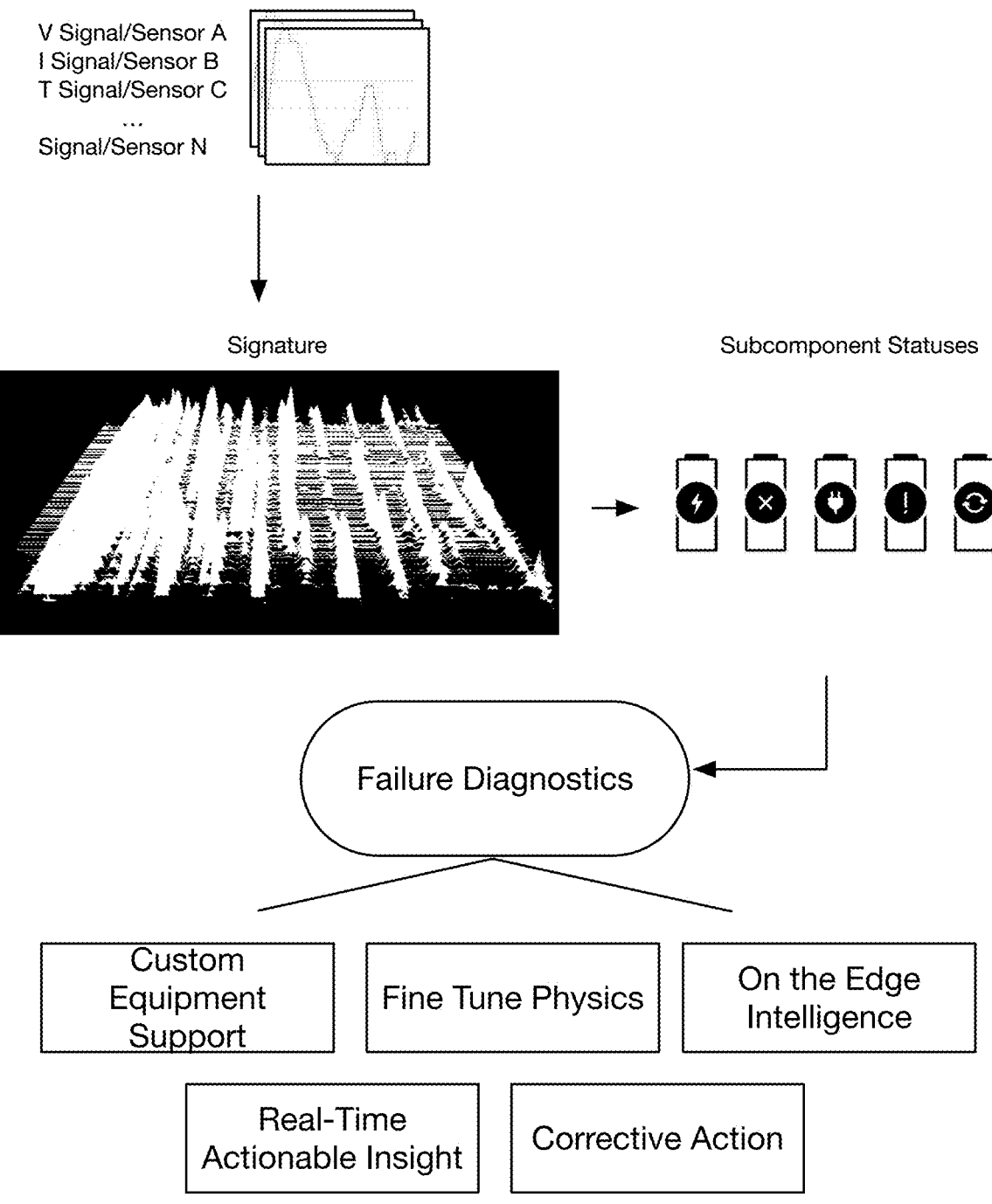
FIG. 5 depicts a variation of a flow of the method for apparatus monitoring.

The system embodiment(s) can, however, be configured to implement other workflows including variations of those described, and/or other workflows (examples, variations, and embodiments of which are shown in FIG. 5).

3.3 Method—Actionable Insights and Downstream Applications

Block S340 recites: returning an analysis including a recommended action for improving or maintaining proper performance of the apparatus, based upon the set of unique signatures. Block S340 functions to process any returned signatures from prior steps, to generate analyses pertaining to health of the apparatus, efficacy of operations of the apparatus, efficiency of operations of the apparatus, and/or other actionable insights.

In embodiments, outputs of Block S340 can be used to guide recommended actions for improving operation of the apparatus or maintaining proper operation of the apparatus (e.g., with optional execution of recommended actions in Block S350).

In variations, recommended actions can include or be associated with one or more of: maintaining normal operation of subcomponents; responding to failed operation (e.g., shorts, grounding issues, over discharge faults, under discharge faults, connector faults, fraying faults, insulation faults, thermal management faults, bearing faults, stator faults rotator faults, etc.) of subcomponents; proactively correcting borderline operation (e.g., near failure) of subcomponents; responding to or otherwise correcting other undesired statuses of one or more of subcomponents of the apparatus being monitored; providing information regarding subcomponent power consumption; performing inventory operations related to anticipated statuses of subcomponents (e.g., in relation to maintaining or adjusting inventory related to replacement subcomponents of an apparatus); performing decision-making guidance (e.g., in relation to cost-benefit analyses of replacing vs. repairing subcomponents or apparatuses); facilitating proactive management of deployed equipment (e.g., individual apparatuses, equipment of a fleet, etc.); and performing other suitable actions.

In generating recommended actions, Block S340 can include returning notifications or other information derived from the analyses in a visual format, in an audio format, in a haptic format, and/or in any other suitable observable format. As such, variations of Block S340 can include generating digital objects (e.g., in visual data formats, in audio data formats, in haptic data formats) or instructions for generating digital objects, in communication with client devices (e.g., devices that are associated with operators of the apparatuses), where the client devices include visual output components (e.g., a display), audio output components (e.g., speaker), haptic output components (e.g., vibrators), and/or any other suitable components. Client devices can also include input components (e.g., keypads, touch displays, microphones, joysticks, mice, etc.) such that the operators or other entities associated with the apparatus can communicate inputs (e.g., commands) related to the generated analyses.

In returning the analysis, Block S340 can include providing information in an automated manner based on thresholds that can be manually set at first and then later adjusted by the AI/NN based on confidence optimization or other factors. Block S340 can, however, include generation of analyses for other suitable recommended actions, provided in another suitable manner.

Block S350 recites: executing the recommended action, which functions to automatically execute recommended actions in order to reduce operator workload in relation to apparatus management.

Executed actions can include or be associated with one or more of: responding to or otherwise correcting undesired statuses of one or more of subcomponents of the apparatus being monitored; performing inventory operations related to anticipated statuses of subcomponents (e.g., in relation to maintaining or adjusting inventory related to replacement subcomponents of an apparatus); performing decision-making guidance (e.g., in relation to cost-benefit analyses of replacing vs. repairing subcomponents or apparatuses); facilitating proactive management of deployed equipment (e.g., individual apparatuses, equipment of a fleet, etc.); and performing other suitable actions.

In an example, the analysis can indicate various faults of one or more subcomponents, and Block S350 can execute instructions for correcting the faulty subcomponent statuses. In another example, Block S350 can initiate automatic performance of a maintenance check upon detecting a high number of events associated with a specific cylinder of an apparatus (e.g., based upon the analysis generated by way of Block S340), with automated execution of a purchase of replacement parts. In another example, Block S350 can automatically readjust inventory (e.g., by stopping orders of replacement components that still have long useful lives, by increasing orders of replacement components that are near the end of their useful lives, etc.) based upon an analysis generated by way of Block S340.

In executing recommended actions, Block S350 can include functionality for generating, transmitting, and/or executing instructions in a computer-readable format and stored in non-transitory media. In variations, such instructions can be generated, transmitted, and/or stored on components of the processing subsystem, client devices, inventory management platforms, vehicle computer architecture (e.g., firmware), industrial apparatus computer architecture (e.g., firmware), and/or other suitable components.

In an example, the analysis can indicate failure of one or more subcomponents of a solar energy system, including one or more of: solar panel components, inverter components, energy storage components, electrical panel components, electric meter components, interfaces to grid components, grid components, and other components. Then, recommended actions in Step S340 can include notifications to clean solar panel components, remove obstructions from solar panel components, inspect specific panels/interconnects/microinverters/inverters, etc., repair electrical infrastructure, inspect meter components, and other actions, which can be executed according to Step S350. In examples, Step S350 can include generating instructions for robotic systems, where such robotic systems are configured to clean or otherwise maintain solar panels. In examples, Step S350 can include automatic ordering of replacement subcomponents. In examples, Step S350 can include automatic guiding of a drone with a camera to a solar energy system for inspection of a specific subcomponent having a fault indication.

In an example, the analysis can indicate failure of one or more subcomponents of solar-thermal energy systems, including one or more of: solar panel components, inverter components, electrical panel components, electric meter components, mirror components, receiver components, heat exchanger components, storage tank components, interfaces to grid components, grid components, and other components. Then, recommended actions in Step S340 can include notifications to clean solar panel components, remove obstructions from solar panel components, inspect specific panels/interconnects/microinverters/inverters, etc., repair electrical infrastructure, repair storage tank components, repair steam turbine components, inspect meter components, and other actions, which can be executed according to Step S350. In examples, Step S350 can include generating instructions for robotic systems, where such robotic systems are configured to clean or otherwise maintain solar panels. In examples, Step S350 can include automatic ordering of replacement subcomponents. In examples, Step S350 can include automatic guiding of a drone with a camera to a solar-thermal energy system for inspection of a specific subcomponent having a fault indication.

In an example, the analysis can indicate failure of one or more subcomponents of wind energy systems (e.g., on-shore wind energy systems, off-shore wind energy systems), including one or more of: rotor components, nacelle components, tower components, gearbox components, generator components, inverters, foundation components, inter-array cable components, substation components, export cable to onshore interconnection components, interfaces to grid components, grid components, and other components. Then, recommended actions in Step S340 can include notifications to inspect specific rotor components, nacelle components, tower components, gearbox components, inverter components, wind turbine sensor components, repair electrical infrastructure, and other actions, which can be executed according to Step S350. In examples, Step S350 can include automatic ordering of replacement subcomponents. In examples, Step S350 can include automatic guiding of a drone with a camera to a wind energy system for inspection of a specific subcomponent having a fault indication.

In an example, the analysis can indicate failure of one or more subcomponents of geothermal energy systems, including one or more of: heat exchanger components, system pump components, valve components, compressor components, turbine components, generator components, cooling tower components, interfaces to grid components, grid components, and other components. Then, recommended actions in Step S340 can include notifications to inspect specific heat exchanger components, system pump components, valve components, compressor components, turbine components, generator components, cooling tower components, interfaces to grid components, grid components, and other components, repair electrical infrastructure, and other actions, which can be executed according to Step S350. In examples, Step S350 can include automatic ordering of replacement subcomponents. In examples, Step S350 can include automatic guiding of a drone with a camera to a geothermal energy system for inspection of a specific subcomponent having a fault indication.

In an example, the analysis can indicate failure of one or more subcomponents of hydropower energy systems, including one or more of: generator components, transformer components, powerhouse components, turbine components, components associated with intakes from a reservoir, components associated with control gates, components associated with penstock access, transformer components, interfaces to grid components, grid components, and other components. Then, recommended actions in Step S340 can include notifications to inspect specific generator components, transformer components, powerhouse components, turbine components, components associated with intakes from a reservoir, components associated with control gates, components associated with penstock access, transformer components, interfaces to grid components, grid components, and other components, repair electrical infrastructure, and other actions, which can be executed according to Step S350. In examples, Step S350 can include automatic ordering of replacement subcomponents. In examples, Step S350 can include automatic guiding of a drone with a camera to a hydropower energy system for inspection of a specific subcomponent having a fault indication.

In an example, the analysis can indicate failure of one or more subcomponents of ocean energy and/or tidal systems, including one or more of: steam condenser components, liquid pump components, vacuum pump components, heat exchanger components, turbine components, turbine tunnel components, sluice gate components, ram joint components, turbine components, interfaces to grid components, grid components, and other components. Then, recommended actions in Step S340 can include notifications to inspect specific steam condenser components, liquid pump components, vacuum pump components, heat exchanger components, turbine components, turbine tunnel components, sluice gate components, ram joint components, turbine components, interfaces to grid components, and other components, repair electrical infrastructure, and other actions, which can be executed according to Step S350. In examples, Step S350 can include automatic ordering of replacement subcomponents. In examples, Step S350 can include automatic guiding of a drone with a camera to an ocean energy and/or tidal energy system for inspection of a specific subcomponent having a fault indication.

In an example, the analysis can indicate failure of one or more subcomponents of biomass energy systems, including one or more of: fuel system components, steam production system components, turbine components, generator components, transformer components, interfaces to grid components, grid components, and other components. Then, recommended actions in Step S340 can include notifications to inspect specific fuel system components, steam production system components, turbine components, generator components, transformer components, interfaces to grid components, grid components, and other components, repair electrical infrastructure, and other actions, which can be executed according to Step S350. In examples, Step S350 can include automatic ordering of replacement subcomponents. In examples, Step S350 can include automatic guiding of a drone with a camera to a biomass energy system for inspection of a specific subcomponent having a fault indication.

In an example, the analysis can indicate failure of one or more subcomponents of power plant components, transformer components for stepping up voltage, transmission line components, transformer components for stepping down voltage, distribution line components, and/or other components. In examples, Step S350 can include automatic ordering of replacement subcomponents. In examples, Step S350 can include automatic guiding of a drone with a camera to a components of such systems for inspection of a specific subcomponent having a fault indication.

In an example, the analysis can indicate failure of one or more subcomponents of electric vehicles, including one or more of: energy management system components, battery components, inverter components, electric motor components, drivetrain components, regenerative breaking system components, other electric vehicle electrical system components, and/or other components. The analysis can additionally or alternatively indicate failure of one or more subcomponents of electric vehicle chargers, including one or more of: alternating current (AC) supply components (e.g., single phase, 3-phase, fixed supply, etc.), metering and billing components, safety interlock components, components of level 1 and level 2 chargers (e.g., rectifier components, power control unit components, direct current (DC) converter components, protection components, battery monitor components, battery management components, etc.), components of level 3 chargers (e.g., control area network (CAN) bus control and authentication components, protection circuit components, battery monitor components, battery management components, etc.), inverter components (e.g., AC/DC bi-directional inverter components, other vehicle-to-grid charging components, and other components. Then, recommended actions in Step S340 can include notifications to inspect specific components, repair electrical systems, and other actions, which can be executed according to Step S350. In examples, Step S350 can include automatic ordering of replacement subcomponents. In examples, Step S350 can include automatic guiding of a drone with a camera to an EV or EV charger system for inspection of a specific subcomponent having a fault indication. Upon detection of an improperly operating EV or EV charging system according to Step S340, Step S350 can include guiding (in the context of autonomous vehicles, in the context of navigation), an EV to an alternative properly-functioning EV charger, and automatically notifying a site manager of EV charging stations regarding the faulty EV charger(s). Upon detection of an improperly operating EV according to Step S340, Step S350 can include guiding (in the context of autonomous vehicles, in the context of navigation), an EV to a vehicle repair station for service (e.g., with appointment scheduling autonomous operations).

Figure 7:
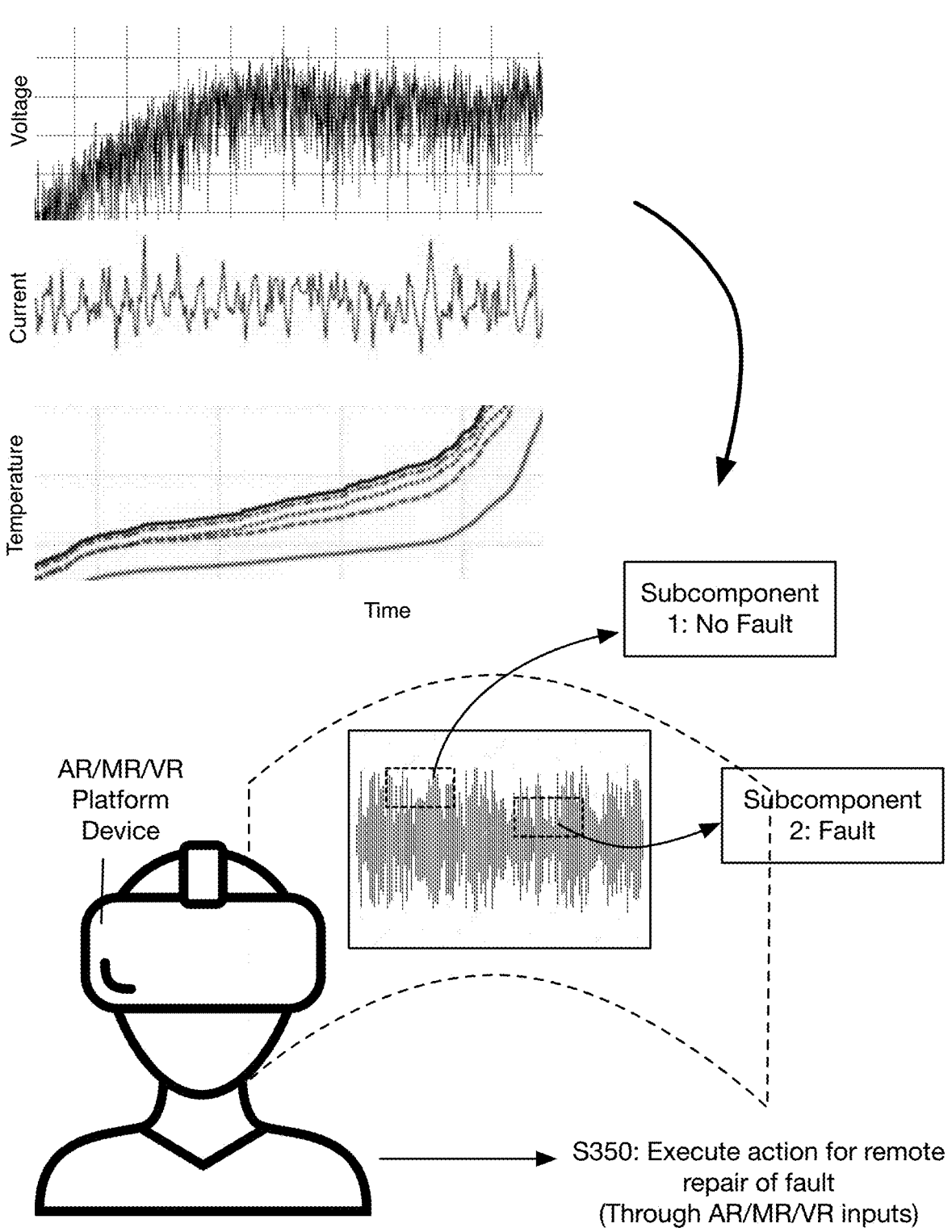
FIG. 7 depicts an example of an interface for an operator of interest in apparatus monitoring and remote addressing of apparatus faults, through AR/MR/VR interfaces.

In relation to Step S350, with applications involving AR/MR/VR devices, the method 400 can include (as shown in FIGS. 6 and 7): executing an action transmitting an analysis of a set of faults of the apparatus 10, for observation through an AR/MR/VR device S410; receiving an input from a user of the AR/MR/VR device, the input configured to respond to at least one of the set of faults of the apparatus S420; and executing instructions for addressing the at least one fault of the set of faults, based upon the input S430, wherein the apparatus is positioned remote from the user. In an example, the AR/MR/VR device can include: an Apple™ Vision device, an Oculus™ device, an HTC™ Vive device, a MERGE™ device, a Samsung™ Gear device, a Meta™ Quest device, or other suitable device. As such, the system 100 can provide real time streaming and leverage next generation AR/MR/VR sensor suites and user interface platforms to bridge the gap between human and machine, for monitoring applications.

The system embodiment(s) can, however, be configured to implement other workflows including variations of those described, and/or other workflows.

4. Computer Systems

Figure 8:
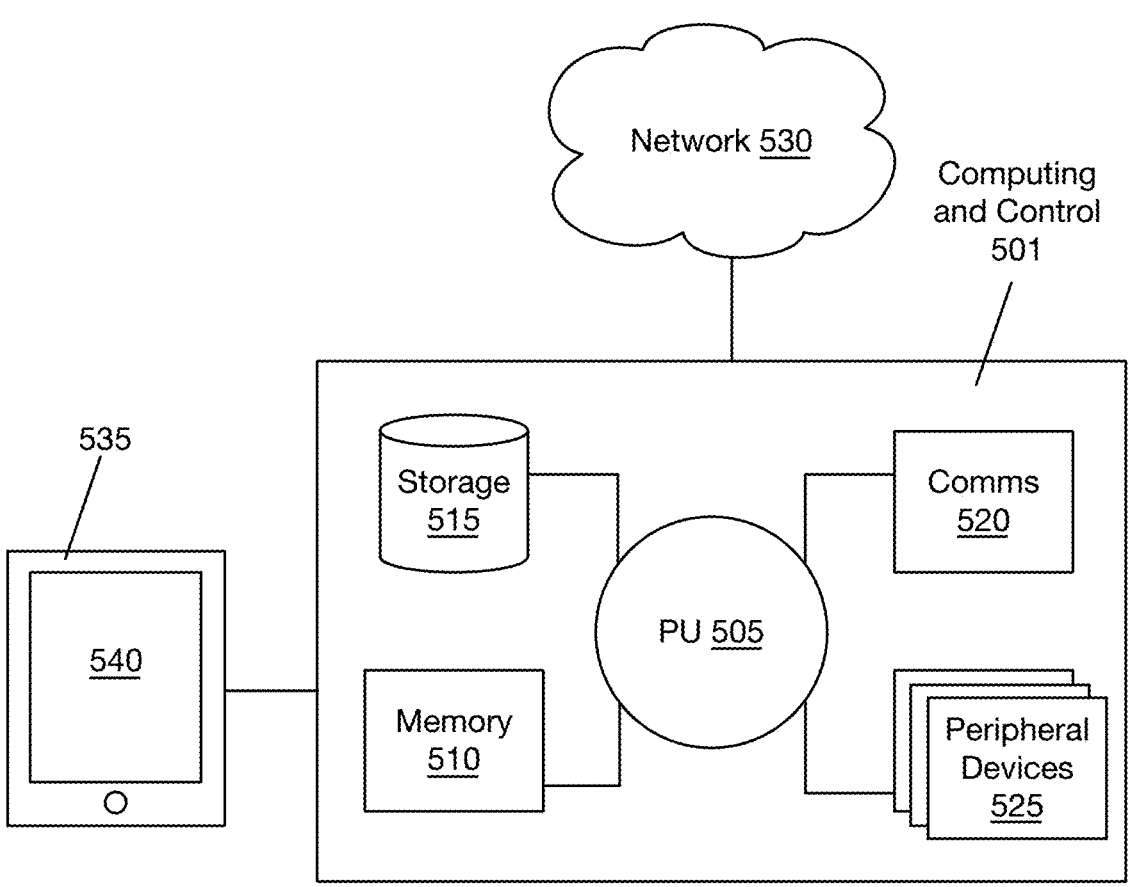
FIG. 8 depicts example computing architecture of a system for apparatus monitoring.

The present disclosure provides computing and control subsystems that are programmed to implement methods associated with the monitoring and prediction devices described. FIG. 8 shows a computing and control subsystem 501 that is programmed or otherwise configured to, for example, provide monitoring capabilities for apparatuses described (e.g., according to methods 300, 400, and system 100).

The computing and control subsystem 501 includes architecture for processing and transmitting data (e.g., electrical signal data, temperature data, etc.) detected from said apparatuses.

The computing and control subsystem 501 can include a processing unit (neural and/or central processing unit) 505, which can be a single core or multi core processor, or a plurality of processors for parallel processing. The computing and control subsystem 501 also includes memory or memory location 510 (e.g., random-access memory, read-only memory, flash memory), electronic storage unit 515, communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the processing unit 505 through a communication bus (solid lines), such as a motherboard. The storage unit 515 can be a data storage unit (or data repository) for storing data. The computer system 501 can be operatively coupled to a computer network ("network") 530 with the aid of the communication interface 520, but also diagnose and generate outputs on-chip. The network 530 can be the Internet, an internet and/or extranet, or an intranet and/or extranet that is in communication with the Internet.

In some embodiments, the network 530 is a telecommunication and/or data network. The network 530 can include one or more computer servers, which can enable distributed computing, such as cloud computing. For example, one or more computer servers may enable cloud computing over the network 530 ("the cloud") to perform various aspects of facilitating charging of an electric vehicle, with desired security, authentication, and locking functionalities associated with various types of charging sessions and/or different users. Such cloud computing may be provided by cloud computing platforms such as, for example, Amazon Web Services (AWS), Microsoft Azure, Google Cloud Platform, and IBM cloud. In some embodiments, the network 530, with the aid of the computer system 501, can implement a peer-to-peer network, which may enable devices coupled to the computer system 101 to behave as a client or a server.

The processing unit 505 can include one or more computer processors and/or one or more neural processing units (NPUs). The processing unit 505 can execute a sequence of machine-readable instructions, which can be embodied in a program or software. The instructions may be stored in a memory location, such as the memory 510. The instructions can be directed to the processing unit 505, which can subsequently program or otherwise configure the processing unit 505 to implement methods of the present disclosure. Examples of operations performed by processing unit 505 can include fetch, decode, execute, and writeback. The processing unit 505 can be part of a circuit, such as an integrated circuit. One or more other components of the computing and control subsystem 501 can be included in the circuit. In some embodiments, the circuit is an application specific integrated circuit (ASIC).

The storage unit 515 can store files, such as drivers, libraries and saved programs. The storage unit 515 can store user data, e.g., user preferences and user programs. In some embodiments, the computer system 501 can include one or more additional data storage units that are external to the computer system 501, such as located on a remote server that is in communication with the computer system 501 through an intranet or the Internet.

The computing and control subsystem 501 can communicate with one or more remote computer systems through the network 530. For instance, the computer system 501 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computing and control subsystem 501, such as, for example, on the memory 510 or electronic storage unit 515. The machine executable or machine-readable code can be provided in the form of software. During use, the code can be executed by the processor 505. The code can be pre-compiled and configured for use with a machine having a processer adapted to execute the code, or can be compiled during runtime. The code can be supplied in a programming language that can be selected to enable the code to execute in a pre-compiled or as-compiled fashion.

Embodiments of the systems and methods provided herein, such as the computing and control subsystem 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, or disk drives, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computing and control subsystem 501 can include or be in communication with an electronic display 535 that comprises a user interface (UI) 540 for providing, for example, a visual display indicative of statuses associated with charging of an electric vehicle, security information, authentication information, and locking statuses associated with various types of charging sessions and/or different users. Examples of UIs include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, facilitate charging of an electric vehicle, with desired security, authentication, and locking functionalities associated with various types of charging sessions and/or different users.

In one set of embodiments, methods implemented by way of or as supported by the computing and control subsystem 501 can include methods for communication of statuses of apparatus 10 and subcomponents to another device (e.g., mobile computing device, wearable computing device, other smart device, etc.). Communicated statuses can then be used by the system 100 to return notifications (e.g., to an apparatus operator or manager, to another entity) and/or execute other actions pertaining to statuses of the apparatus 10, where example executed actions can include generation of instructions to control states of the apparatus for safety, or to address faults identified as described above, and/or generation of instructions to control states of the apparatus.

Additionally or alternatively, the computing and control subsystem 501 can include architecture with programming to execute other suitable methods.

5. Conclusions

The FIGURES illustrate the architecture, functionality and operation of possible implementations of systems, methods and computer program products according to preferred embodiments, example configurations, and variations thereof. In this regard, each block in the flowchart or block diagrams may represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

What is claimed is:

1. A system for monitoring an apparatus, the system comprising:

a sensor subsystem comprising a voltage sensor, a current sensor, and a temperature sensor;

a housing surrounding the sensor subsystem;

a mounting interface coupled to the housing and configured to couple to the apparatus, such that the sensor subsystem can detect signals from an output of at least one of a battery, a generator, a motor, and an inverter of the apparatus, if the apparatus comprises the battery, the generator, the motor, or the inverter;

a signal conditioning and communications subsystem coupled to the sensor subsystem within the housing and configured to receive a voltage signal stream, a current signal stream, and a temperature signal stream from the sensor subsystem; and a processing subsystem coupled to the signal conditioning and communications subsystem and comprising a neural processing unit (NPU) comprising 1 trillions of operations per second (TOPS) capability, comprising self-attention time-series transformer architecture with an encoder block comprising multi-head attention sub-architecture, and omitting a decoder block, the processing subsystem contained within the housing and comprising non-transitory media storing instructions that, when executed, perform operations for:

receiving data derived from the voltage signal stream, the current signal stream, and the temperature signal stream;

performing a set of transformation operations upon said data;

identifying a set of unique signatures corresponding to states of a set of subcomponents of the apparatus, from the set of transformation operations; and returning an analysis comprising a recommended action for maintaining performance of the apparatus, based upon the set of unique signatures.

2. The system of claim 1, wherein the sensor subsystem further comprises a demand sensor structured to detect rotation of a rotating component of the apparatus.

3. The system of claim 1, wherein the NPU comprises energy use performance of less than 1 picojoule per operation.

4. The system of claim 1, wherein the apparatus comprises a solar energy system.

5. The system of claim 4, wherein the set of subcomponents comprises a solar panel component, an inverter component, an energy storage component, an electrical panel component, and an electric meter component.

6. The system of claim 1, wherein the apparatus comprises an electric vehicle, and wherein the set of subcomponents comprises an energy management system component, an electric vehicle battery component, an inverter component, an electric motor component, a drivetrain component, and a regenerative breaking system component.

7. The system of claim 1, wherein the apparatus comprises an electric vehicle charger, and wherein the set of subcomponents comprises an alternating current (AC) supply component, a safety interlock component, a rectifier components, a power control unit component, a direct current (DC) converter component, a battery monitor component, a battery management component, a control area network (CAN) bus control and authentication component, or a vehicle-to-grid charging component.

8. A system for monitoring an apparatus, the system comprising:

a voltage sensor and a current sensor;

a housing surrounding the voltage sensor and the current sensor;

a mounting interface coupled to the housing and configured to couple the system to the apparatus such that the voltage sensor and the current sensor can detect signals from an output of a battery of the apparatus without directly contacting the battery;

a signal conditioning and communications subsystem coupled to the voltage sensor and the current sensor within the housing and configured to receive a voltage signal stream from the voltage sensor and a current signal stream from the current sensor; and a processing subsystem coupled to the signal conditioning and communications subsystem and comprising a neural processing unit (NPU) comprising 1 trillions of operations per second (TOPS) capability, comprising self-attention time-series transformer architecture with an encoder block comprising multi-head attention sub-architecture, and omitting a decoder block, the processing subsystem contained within the housing and comprising on-chip self-attention time-series transformer architecture for processing the voltage signal stream and the current signal stream.

9. The system of claim 8, wherein the processing subsystem comprises non-transitory media storing instructions that, when executed, perform operations for:

receiving data derived from the voltage signal stream and the current signal stream;

performing a set of transformation operations upon said data;

identifying a set of unique signatures corresponding to states of a set of subcomponents of the apparatus, from the set of transformation operations; and returning an analysis comprising a recommended action for improving or maintaining proper performance of the apparatus, based upon the set of unique signatures.

10. The system of claim 8, wherein the apparatus comprises at least one of: a renewable energy system, an electric vehicle, and an electric vehicle charger.

11. A method for monitoring an apparatus, the method comprising:

providing a mounting interface between a sensor subsystem coupled to a signal processing subsystem, and the apparatus, the sensor subsystem comprising a voltage sensor, a current sensor, and a temperature sensor, and wherein providing the mounting interface comprises mounting the sensor subsystem to the apparatus, such that the voltage sensor, the current sensor, and the temperature sensor can detect signals from an output of a battery of the apparatus without directly contacting the battery;

sampling a voltage signal stream, a current signal stream, and a temperature signal stream generated from the sensor subsystem during operation of the apparatus;

performing a set of transformation operations upon the voltage signal stream, the current signal stream, and the temperature signal stream with a neural processing unit (NPU) comprising 1 trillions of operations per second (TOPS) capability, wherein the set of transformation operations comprises operations applied by self-attention time-series transformer architecture with an encoder block comprising multi-head attention subarchitecture, and wherein the self-attention time-series transformer architecture omits a decoder block;

identifying a set of unique signatures corresponding to faults of a set of subcomponents of the apparatus from the set of transformation operations; and returning an analysis comprising a recommended action for maintaining performance of the apparatus, based upon the set of unique signatures.

12. The method of claim 11, wherein the apparatus comprises a renewable energy system, and wherein the set of subcomponents comprises a component of the renewable energy system.

13. The method of claim 12, further comprising executing the recommended action, wherein the recommended action comprises guiding a drone for inspection of the component of the renewable energy system, in response to a fault of the component of the renewable energy system.

14. The method of claim 11, wherein the apparatus comprises an electric vehicle charger, and wherein the set of subcomponents comprises an alternating current (AC) supply component, a safety interlock component, a rectifier components, a power control unit component, a direct current (DC) converter component, a battery monitor component, a battery management component, a control area network (CAN) bus control and authentication component, or a vehicle-to-grid charging component.

15. The method of claim 14, further comprising executing the recommended action, wherein the recommended action comprises guiding an electric vehicle to an alternative properly-functioning electric vehicle charger, in response to a fault of at least one of the set of subcomponents.

16. The method of claim 11, further comprising executing the recommended action, wherein executing the recommended action comprises:

transmitting information from the analysis, for observation through a mixed-reality device;

receiving an input from a user of mixed reality device, the input configured to respond to at least one of a set of faults of the apparatus indicated in the analysis; and executing instructions for addressing the at least one fault of the set of faults, based upon the input, wherein the apparatus is positioned remote from the user.

* * * * *